United States Patent
Chubanov

(10) Patent No.: US 12,449,790 B2
(45) Date of Patent: Oct. 21, 2025

(54) SCHEDULING JOBS OF A MANUFACTURING OR LOGISTICS PROCESS

(71) Applicant: Robert Bosch GmbH, Stuttgart (DE)

(72) Inventor: Sergei Chubanov, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 17/724,106

(22) Filed: Apr. 19, 2022

(65) Prior Publication Data

US 2022/0404815 A1 Dec. 22, 2022

(30) Foreign Application Priority Data

May 21, 2021 (EP) ..................................... 21175418

(51) Int. Cl.
*G05B 19/418* (2006.01)
*G06Q 10/08* (2023.01)

(52) U.S. Cl.
CPC .. *G05B 19/41865* (2013.01); *G05B 19/41835* (2013.01); *G06Q 10/08* (2013.01)

(58) Field of Classification Search
None
See application file for complete search history.

(56) References Cited

U.S. PATENT DOCUMENTS

| | | | | |
|---|---|---|---|---|
| 9,424,074 B1* | 8/2016 | Pjesivac-Grbovic | ..... | G06F 9/48 |
| 11,176,461 B1* | 11/2021 | Merritt | ............. | G06Q 30/0282 |
| 2018/0246758 A1* | 8/2018 | Cardonha | .......... | G06Q 10/0631 |
| 2018/0336509 A1* | 11/2018 | Guttmann | ........... | G06F 21/6218 |
| 2019/0294999 A1* | 9/2019 | Guttmann | ............. | G06F 18/217 |
| 2020/0065736 A1* | 2/2020 | Relangi | .................. | G06N 20/20 |
| 2020/0192715 A1* | 6/2020 | Wang | .................. | G06F 12/0253 |
| 2020/0257992 A1* | 8/2020 | Achin | ..................... | G06Q 10/04 |
| 2020/0320401 A1* | 10/2020 | Jampani | ................ | G06N 3/047 |
| 2021/0092069 A1* | 3/2021 | Musleh | .............. | H04L 47/2441 |
| 2022/0187841 A1* | 6/2022 | Ebrahimi Afrouzi | ....................... | G05D 1/0274 |
| 2022/0187847 A1* | 6/2022 | Cella | ...................... | G06Q 10/06 |
| 2022/0300323 A1* | 9/2022 | Xu | ........................ | G06F 9/4881 |

(Continued)

FOREIGN PATENT DOCUMENTS

WO 2021026481 A1 2/2021

OTHER PUBLICATIONS

Geiger et al., "Rapid Modeling and Discovery of Priority Dispatching Rules: an Autonomous Learning Approach," Journal of Scheduling, vol. 9, 2006, pp. 7-34.

*Primary Examiner* — Hua Lu
(74) *Attorney, Agent, or Firm* — NORTON ROSE FULBRIGHT US LLP

(57) ABSTRACT

A computer-implemented method of scheduling jobs of a manufacturing or logistics process using a priority function. The priority function is evaluated on multiple to be scheduled jobs to obtain multiple respective priority values. The priority function is defined to invoke a kernel function. The kernel function is defined to compare representations of two respective jobs. Evaluating the priority function on a selected job comprises evaluating the kernel function on representations of the selected job and one or more reference jobs. The schedule for the multiple jobs is determined based on the priority values and is then output to enable the multiple jobs to be carried out according to the schedule.

20 Claims, 11 Drawing Sheets

(56) References Cited

U.S. PATENT DOCUMENTS

| | | | |
|---|---|---|---|
| 2022/0343155 A1* | 10/2022 | Mitra | G06F 18/29 |
| 2023/0266999 A1* | 8/2023 | Zhang | G06F 9/5027 |

* cited by examiner

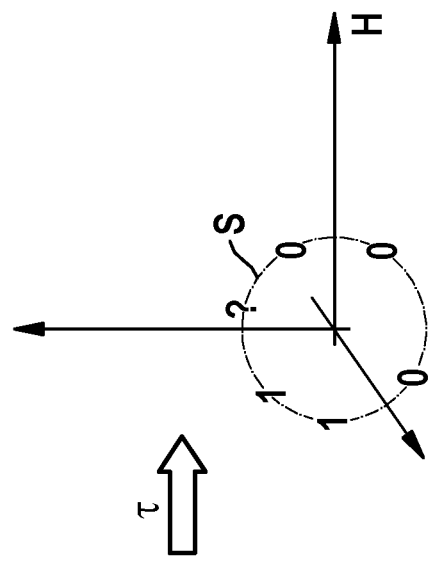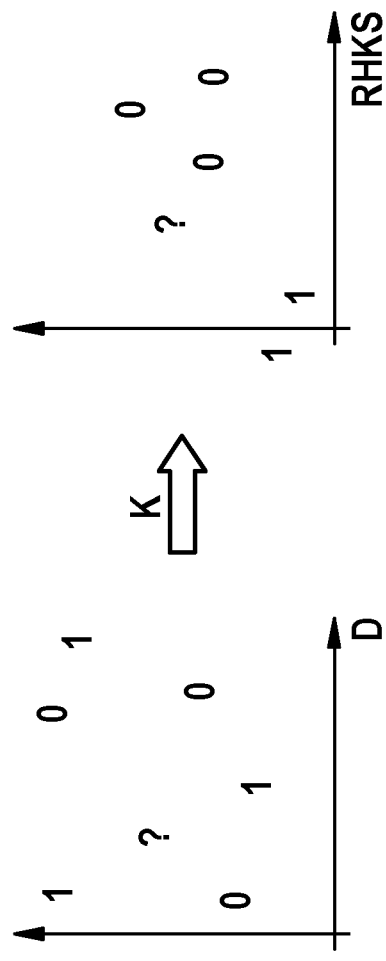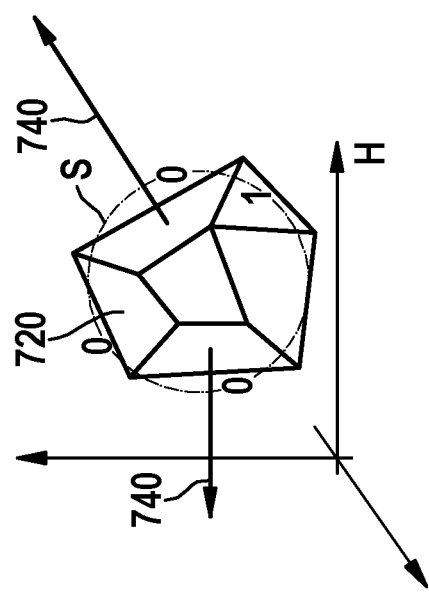

SCHEDULING JOBS OF A MANUFACTURING OR LOGISTICS PROCESS

CROSS REFERENCE

The present application claims the benefit under 35 U.S.C. § 119 of European Patent Application No. EP 21 17 5418.9 filed on May 21, 2021, which is expressly incorporated herein by reference in its entirety.

FIELD

The present invention relates to a computer-implemented method of scheduling jobs of a manufacturing or logistics process, and to a corresponding system. The present invention further relates to a computer-implemented method of determining a priority function for such scheduling, and to a corresponding system. The present invention further relates to a computer-readable medium comprising instructions to perform one of the above methods and/or a priority function.

BACKGROUND INFORMATION

In manufacturing and logistics, scheduling systems are used to determine an efficient distribution of jobs among available resources, such as manufacturing machines, in order to achieve a given goal, such as minimizing the average completion time or balancing the workload of machines. It is of vital importance to schedule jobs as efficiently as possible. An efficient schedule allows to use the machines efficiently, leading to increased production capacity, faster completion of orders, and reduced costs. At the same time, especially for large-scale manufacturing and logistics tasks, it is known to be a computationally difficult problem to schedule a large number of jobs in an optimal or near-optimal way.

Conventionally, jobs may be scheduled according to a list scheduling procedure. In list scheduling, jobs are scheduled according to a priority function. A priority function is a function which determines a job that should be scheduled next. Given a priority function, jobs can be scheduled iteratively by, in an iteration, choosing a job with highest priority, and scheduling it as early as possible taking into account current availability and feasibility constraints. This procedure is known as list scheduling. List scheduling has the advantage that it determines a schedule in a computationally efficient way. This makes list scheduling particularly suitable for large-scale applications and/or applications where jobs have to be scheduled according to complex constraints. Moreover, the priority function does not have to be recomputed if the constraints change, making list scheduling suitable for situations where the schedule needs to be frequently recomputed or adaptively determined.

Various priority functions are available that perform reasonably well under certain circumstances. However, each concrete production environment imposes its own specific constraints and may change over time because of different factors. This means that, given a particular manufacturing or logistics process, it is beneficial to apply a priority function that is tailored to that particular manufacturing or logistics process. An approach for learning a set of priority rules is described in, e.g., C. D. Geiger et al., "Rapid Modeling and Discovery of Priority Dispatching Rules: An Autonomous Learning Approach", J Sched 9, 7-34 (2006). In this paper, a class of priority functions is defined using relational, arithmetic, and conditional operators and functions, in terms of the current values of job, machine and system attributes and numeric constants. An evolutionary algorithm is presented for learning a priority function from this class.

SUMMARY

It would be desirable to schedule jobs of a manufacturing or logistics process using better-performing priority functions, e.g., priority functions that lead to a more efficient schedule. It would furthermore be desirable to automatically determine such better-performing priority functions, and/or to determine priority functions in a computationally more efficient way.

In accordance with a first aspect of the present invention, a computer-implemented method and a corresponding scheduling system are provided for scheduling jobs of a manufacturing or logistics process according to a priority function. In accordance with another aspect of the present invention, a computer-implemented method and a corresponding training system are provided for determining such a priority function. In accordance with an aspect of the present invention, a computer-readable medium is also provided.

Various embodiments of the present invention relate to the use of a priority function to schedule jobs (also referred to as tasks) of a manufacturing or logistics process. The priority function may be defined to determine a priority value indicating a priority for a job of the manufacturing or logistics process. As input, the priority function may receive a representation of the job, for example including one or more attributes relating to the job, such as a release date, a weight, and/or a processing time of the job. Various examples are given throughout. As output, the priority function may provide a priority value, e.g., a real-valued number. For example, a higher priority value may represent a higher (or lower) priority of the job.

The priority function may be used to determine a schedule for the multiple jobs. The schedule may indicate at which point in time a particular job is assigned to a particular resource, for example, a particular manufacturing device of a manufacturing system. For example, the schedule may be determined using list scheduling. It is not needed to determine a schedule for all of the jobs in one go, e.g., the schedule may be progressively determined during the manufacturing or logistics process and/or the set of jobs and/or the determined schedule may be updated over the course of time.

Interestingly, the inventors propose to use a priority function that is defined to invoke a kernel function. As is conventional in the field of machine learning, a kernel function is a function that takes as input two elements from a set and that satisfies two mathematical properties, namely, it is symmetric and positive semi-definite. A kernel function may be thought of as essentially comparing the two input elements in the sense of computing an inner product between the two input elements in an (implicit) feature space. In machine learning, kernel functions are used to deal with input elements, e.g., to a classifier, for which it is hard to define a suitable inner product on the elements themselves.

Surprisingly, the inventors realized that this principle can be used to define priority functions for use in scheduling. Namely, a priority value for a job may be computed based on one or more respective comparisons, namely, invocations of the kernel function, of the job with respective reference jobs. For example, the job may be compared to at least two, at least five, or at least fifty reference jobs. A priority function can for example be a linear combination of such comparisons with respective reference jobs. Other classes of priority functions that are defined based on such comparisons with reference jobs are also possible; examples are given throughout.

Mathematically, it may be said that given a representation of a reference job as its first input, the kernel function induces a function that takes the second input to the kernel function and applies the kernel function to the first and second inputs. This function may be referred to as an evaluation function. A priority function that includes one or more such evaluation functions, may be referred to as a kernel-induced priority function.

In accordance with an example embodiment of the present invention, when scheduling a set of multiple jobs, the priority function may be evaluated on the multiple respective jobs to obtain multiple respective priority values. This evaluation may involve evaluating the kernel function to compare a representation of a selected job to the respective reference jobs. Based on the priority values, a schedule may be determined, for example by list scheduling, and the schedule may be used to enable the multiple jobs to be carried out according to the schedule.

The inventors found that using a kernel function to compare the job to be scheduled to a number of reference jobs, provides a class of priority rules that is expressive, and allows to represent high-quality rules that can significantly outperform traditional heuristics used for list scheduling. In particular, the priority rules may be determined according to techniques described herein, leading to particularly well-functioning rules. Thus, jobs in a manufacturing or logistics process can be scheduled more efficiently. By adapting the way that reference jobs are combined into a priority function, e.g., the coefficients of a linear combination, the priority rules can be easily adapted to different manufacturing or logistics processes. Also the used kernel function can be easily adapted, e.g., to take into account attributes relevant to the process at hand and/or to include data that relates to the set of jobs to be scheduled in general as opposed to just the job for which the kernel function is evaluated, as shown in various examples provided herein.

Optionally, a representation of a job input to the kernel function may comprise one or more attributes of the job and/or one or more logarithms of such attributes. The attributes may include, for example, a release date, a weight, and/or a processing time. These are relevant attributes to take into account in scheduling. The logarithms of the rules may allow to obtain priority functions generalizing the so-called posynomial rules sometimes used in the literature, which turns out to work well. Including both attributes and their logarithms in the representation was found to provide particularly good results.

Optionally, the representation of a selected job may also include aggregates of one or more job attributes over the current instance of the scheduling problem, e.g., the current set of jobs to be scheduled. The aggregate can be an average or a sum, for example. Thus, global characteristics of the problem instances can be taken into account, leading to a more flexible class of priority rule that allows better scheduling. The aggregate can include the selected job, but interestingly, it is also possible to exclude the selected job, which has the advantage that the aggregate can be used to better distinguish between different jobs of the same problem instance, improving expressivity.

Optionally, evaluating the kernel function for a first and a second job may comprise computing a degree of similarity between respective sets of jobs corresponding to the first and second job, respectively. In particular, when used to compare a selected job from a set of multiple jobs to be scheduled to a reference job, a degree of similarity may be computed between the set of multiple jobs to be scheduled, and a set of jobs corresponding to the reference job, for example, the latter set of jobs may represent the scheduling problem from which the reference job was selected during training. The degree of similarity may be computed by an intersection kernel as is conventional. Effectively, the job may thus be considered more similar to reference jobs that come from more similar reference instances, leading to a kernel that determines a more expressive and more accurate overall similarity. The degree of similarity can be computed over the whole respective scheduling instances, but interestingly it is also possible to exclude the first and second jobs from the computation of the similarity, allowing the kernel function to better distinguish different jobs from the same scheduling instance.

Optionally, in order to determine a schedule, multiple respective schedules may be determined according to respective priority functions, and a schedule may be selected among the respective schedules, for example, a schedule that takes the least overall time, or that is optimal among the respective schedules according to any other selection criterion. Thus, it is possible to apply a collection of priority functions, and select an optimal priority function for the situation at hand. This way, flexibility is further increased, and it is enabled to use a collection of priority functions that are beneficial for different situations, and automatically select which priority function to use for a particular case.

Generally, the priority function may be represented in many different ways. Typically, the data representing the priority function explicitly includes the representations of the reference jobs that are used to define the priority function, for example, along with respective coefficients for linearly or otherwise combining the reference job comparisons. However, this is not needed, e.g., the priority function may be represented in such a way that the data representing the reference jobs are hard-coded into the priority function, e.g., the priority function may be represented as a circuit, as a set of instructions, etc. In many cases, the evaluation of the kernel function on a selected job and one or more reference jobs comprises determining respective kernel function outputs with respect to the respective reference jobs, but the evaluation can in some cases also be performed as an overall computation in which the outputs of the kernel function for the respective reference jobs are not individually computed. For example, the kernel function may be invoked on an aggregate of the respective reference jobs, or a circuit optimizer or similar may be executed on the overall computation of the priority function, which may make it hard or impossible to identify individual kernel function invocations and/or reference jobs in the circuit representing the priority function. For example, in some cases, priority functions determined using the techniques described herein, may be represented by posynomials. More powerful priority functions may not be representable as posynomials, however, and/or may not be linear in the argument representing the reference job.

Various embodiments of the present invention relate to the automatic determination of priority functions for use in such scheduling. The priority function may be determined based on training data comprising a set of multiple training jobs. One or more training instances may be obtained from the training data. A training instance may be a solved instance of the scheduling problem, in the sense that training instance contains multiple jobs for which an ordering according to a target schedule is available. The training may be aimed at letting the priority function reproduce the target schedule by using the kernel function. The multiple jobs may comprise an earlier job that is ordered according to the target schedule before a later job, e.g., the earlier job will be carried out earlier in the process than the later job. The optimization may be configured to penalize the priority function for assigning a higher priority to the later job than to the earlier job, in other words, the priority function is rewarded for assigning a higher priority to the earlier job than to the later job. This optimization may involve invoking the kernel function on respective training jobs of the same training instance and/or of different training instances of the training set. Over the training set, the function may be rewarded for prioritizing jobs scheduled earlier according to the target schedules of the training instances. The priority function may therefore be trained to compute priority values that, when used for scheduling, e.g., with list scheduling or similar, lead to schedules that are similar to the target schedules.

Learning the priority function as a combination of comparisons to reference jobs makes it possible to learn the priority function particularly efficiently. The use of a kernel function allows to treat the problem of optimizing the priority function as a geometric optimization problem in the Hilbert space associated to the kernel function. In particular, the optimization may be performed by performing a sequence of projections onto convex sets associated with the optimization problem. Accordingly, Bayesian optimization or other types of black-box optimization methods may be avoided, improving training efficiency. During the selection of the priority function from the class of kernel-induced priority functions, trainable parameters of the kernel function are typically kept fixed; the optimization may rather concern the reference jobs that are used and/or the way the different comparisons with the reference jobs are combined in the overall priority function.

Moreover, by performing an optimization of the priority function with respect to a given target schedule, it is prevented to have to repeatedly perform scheduling (e.g., according to the list scheduling heuristic, or according to any optimal or near-optimal scheduling algorithm) during the training itself. The training takes the target schedule and optimizes the priority function with respect to its ordering, typically without any further information about the target schedule. This makes the training procedure particularly efficient, for example, making it possible to learn priority functions that use a relatively large amount of reference jobs. Thus, the proposed training procedure allows to effectively determine expressive priority functions.

Interestingly, the procedure for determining the priority function may be independent from the objective function and feasibility conditions imposed by the manufacturing or logistics process at hand. The desirability of certain priority functions is effectively encoded in the target schedules for the training instances. Thus, the procedure can be flexibly re-used in various different contexts without reconfiguration.

The scheduling instances used during training are typically much smaller than the scheduling instances to which the priority function is applied in use. For example, a scheduling instance during training may comprise at most 10, at most 20, or at most 50 jobs. A scheduling instance in use may comprise at least 1000, at least 10000, or at least 100000 jobs. It is advantageous to use small scheduling instances for training, both because it makes training computationally more efficient, and because it typically results in a smaller priority function, e.g., a priority function that is based on less reference jobs. For example, the priority function that is output according to the optimization may include, at least potentially, all jobs from the training set as reference jobs.

Optionally, to obtain the training set, a set of training jobs may be obtained, and the training set may be determined from the set of training jobs. For example, the set of training jobs may comprise one or more regular, e.g. large, instances of the scheduling problem. A training instance of the training set may be determined by selecting its jobs from the set of training jobs, e.g., by random sampling. For this set of jobs, a target schedule may be determined which may be used to determine the priority function as described herein.

Various ways of determining the target schedule are possible, e.g., a collection of heuristic schedulers may be applied to obtain respective schedules, and/or schedules may be obtained by performing a random search in which list scheduling is applied based on randomly generated permutations. A best schedule may be selected from such schedules according to an objective function.

Optionally, the target schedule for the training instance may be determined by determining an optimal or near-optimal target schedule. An optimal target schedule is schedule that is optimal according to an objective function. A near-optimal schedule is any schedule that is determined according to a procedure that provides schedules of a sufficient quality, e.g., sufficient for production use, but that is considered too computationally expensive to be applied to regular scheduling instances, e.g., those occurring in production use. For example, the optimal or near-optimal schedule may be determined by performing an optimization with respect to the objective function. In some settings, also random search may provide an optimal or near-optimal schedule. Because the training instance is typically much smaller than regular scheduling instances, it can be feasible to obtain an optimal or near-optimal schedule for the training instance. The priority function can then be effectively trained to approximate the optimal or near-optimal scheduling behaviour on larger problem instances. Generally, the better the quality of the target schedule, the better the expected quality of the priority functions that are determined based on it.

Optionally, the class of priority functions may be a class of linear combinations of comparisons with reference jobs. For example, the priority function may be represented by first representations of respective reference jobs and by respective coefficients, and the priority function may be applied to a representation of a job by respectively evaluating the kernel function on respective first representations and the representation of the job, and computing a linear combination of the respective kernel function outputs according to the respective coefficients.

For this class of priority functions, a loss function may be defined over respective pairs of consecutive earlier and later jobs of training instances of the training set, and this loss function may be optimized, thus penalizing the priority function for assigning a higher priority to the later job than to the earlier job. Interestingly, for this class of priority function, the problem to optimize this loss function may correspond to a convex optimization problem in the Hilbert space corresponding to the kernel function. Thus, this optimization can be performed particularly efficiently using convex optimization techniques.

Optionally, the optimization of the loss function mentioned above may be implemented iteratively. In an iteration, the earlier job and the later job may be selected from the respective pairs such that the earlier and later job provide a contribution to the loss function. The priority function may then be adapted to reduce the contribution to the loss function. In particular, the adaptation may be implemented efficiently as a projection onto a convex set associated with the optimization problem. Interestingly, such an iterative implementation can guarantee that, if a priority function in the class exists that eliminates all pairwise contributions to the loss function, this priority function is found by the optimization, thus providing a priority function that fully recovers the target schedule on the training set, e.g., it sorts the jobs of the training instances according to their target schedules, and is thus expected to provide high-quality schedules.

Optionally, the priority function may be based on respective position priority functions for given positions in the training instances. A position priority function for a given position may be configured to separate jobs occurring at the given position in the respective training instances at least from jobs occurring after the given position in the respective training instances. For example, a position priority function for the second position may generally provide high (or: low) values for jobs that occur at the second position in the respective training instances, and may generally provide low (or: high) values for jobs that occur at other positions in the respective training instances, or at least, that occur at later positions in the respective training instances. A position priority function may include one or more respective comparisons by the kernel function with respective reference jobs. Such a priority function may be obtained in various ways; examples are provided herein. By suitably combining the position priority functions, a priority function may be obtained that generally provides priority values to jobs corresponding to their positions in the training instances.

The use of position priority functions has been found to provide particularly efficient schedules. A particularly preferred case is when the position priority function perfectly separates the jobs at the given position from the other jobs, e.g., the later jobs or all other jobs. That is, there is a boundary value that separates the values of the position priority function for the jobs at the given position from the other jobs. This makes it possible to define the priority function in such a way that it perfectly reproduces the target schedule, e.g., it sorts the jobs of the training instance according to the target schedule, also in cases where such a priority function does not exist as a linear combination of comparisons with reference jobs.

Optionally, the position priority function may be determined as a classifier defined by a system of inequalities. The classifier may perform classification based on the number of inequalities satisfied, e.g., all or none should be satisfied. An inequality may be defined in terms of one or more respective comparisons by the kernel function with respective reference jobs. For example, a linear combination of comparisons may be required to be smaller than or equal (or larger than or equal) to a target value. The value of the position priority function may be defined based on respective differences to the decision boundaries of the respective inequalities, e.g., respective differences between the left-hand sides and right-hand sides of the respective inequalities.

By using a sufficient number of inequalities, it is possible to determine the classifier in such a way that it perfectly classifies the jobs as being at the given position from the other jobs. By defining the position priority function based on such a classifier, it is possible to obtain a position priority function with perfect separation as well. For example, if the classifier classifies the job as occurring at the given position if all left-hand sides are larger (or: smaller) than zero, then the value of the position priority function may be defined as the minimum (or: minimum) of the left-hand sides. If perfect separation is not achieved, still, a position priority function may be obtained that provides a reasonable degree of separation and can thus be used to obtain a position priority function that reproduces the target schedules to a reasonable degree.

The proposed techniques for scheduling jobs can be used in a manufacturing system to carry out the jobs according to the schedule. The manufacturing system may be configured to determine control signals for the respective manufacturing units of the manufacturing system, e.g., robots or other types of manufacturing machines. The manufacturing units may carry out the manufacturing according to the control signals, and accordingly carry out the schedule according to the determined schedule. Thus, scheduling in the manufacturing system is improved. The proposed techniques can be similarly used in a logistics system, e.g., for planning jobs of robots operating in a warehouse. The techniques can also be applied in any other area where scheduling of jobs is needed, e.g., the jobs do not need to be jobs of a manufacturing or logistics process.

It will be appreciated by those skilled in the art, in view of the disclosure herein, that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the example embodiments described by way of example in the following description and with reference to the figures.

FIG. 7B shows a schematic representation of a hyperplane in a Hilbert space, in accordance with an example embodiment of the present invention.

FIG. 7C shows a schematic representation of a polyhedron in a Hilbert space, in accordance with an example embodiment of the present invention.

FIG. 7D shows a schematic representation of spaces and mappings, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
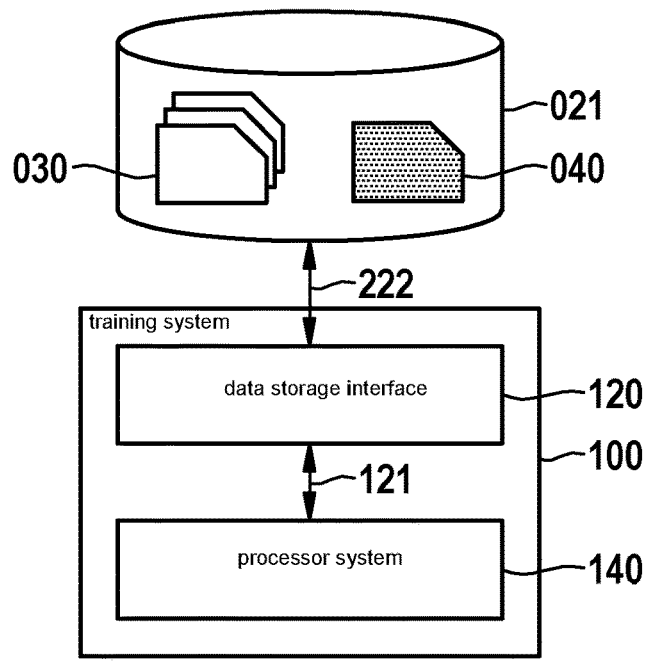
FIG. 1 shows a training system for determining a priority function, in accordance with an example embodiment of the present invention.

FIG. 1 shows a training system 100 for determining a priority function for scheduling jobs of a manufacturing or logistics process. The priority function may be defined to determine a priority value indicating a priority for a job of the manufacturing or logistics process. The system 100 may comprise a data interface 120 for accessing training data 030. Training data 040 may comprise a set of multiple training jobs. The set of training jobs may comprise at most or at least 1000, at most or at least 10000, or at most or at least 100000 jobs, for example. For example, the set of training jobs may be a regular scheduling instance for which the priority function is to be configured, or multiple such regular instances. As shown in the figure and also explained below, the data interface may also be for accessing the determined priority function 040. The determined priority function 040 may be used to schedule the jobs of the manufacturing or logistics process according to a method described herein, e.g., by system 200 of FIG. 2 or by system 300 of FIG. 3.

For example, as also illustrated in FIG. 1, the input interface may be constituted by a data storage interface 120 which may access the data 03, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, obtain from the training data one or more training instances. A training instance may comprise multiple jobs of set of the training jobs ordered according to a target schedule. The multiple jobs may comprise an earlier job ordered before a later job. The processor system 140 may be further configured, during operation of the system, obtain a kernel function. The kernel function may be fixed, e.g., hardcoded, or configurable, for example. For example, instructions for evaluating the kernel function may be accessible via data interface 120. The kernel function may be defined to compare representations of two respective jobs. A class of priority functions may be defined in terms of the kernel function. A priority function of the class of priority functions may include comparison according to the kernel function with one or more reference jobs. The processor system 140 may be further configured to, during operation of the system 100, determine the priority function by performing an optimization. The optimization may be configured to select the priority function from the class of priority functions. The optimization may be configured to penalize the priority function for assigning a higher priority to the later job than to the earlier job.

The processor subsystem 140 may be further configured to, during operation of the system 100, output the determined priority function from the class of priority functions. For example, the priority function may be provided, directly or indirectly, to a manufacturing system for use in its scheduling, e.g., as discussed with respect to FIG. 2 or FIG. 3. The system 100 may comprise an output interface for outputting the determined priority function. For example, as also illustrated in FIG. 1, the output interface may be constituted by the data interface 120, with said interface being in these embodiments an input/output ('IO') interface, via which the priority function may be stored in the data storage 021. In some embodiments, the output interface may be separate from the data storage interface 120, but may in general be of a type as described above for the data storage interface 120. The output interface can also be a communication interface for communication with another system, e.g., for direct communication using USB, IEEE 1394, or similar, or for communication over a computer network, for example, an internet, an intranet, a LAN, a WLAN, etc.

Figure 2:
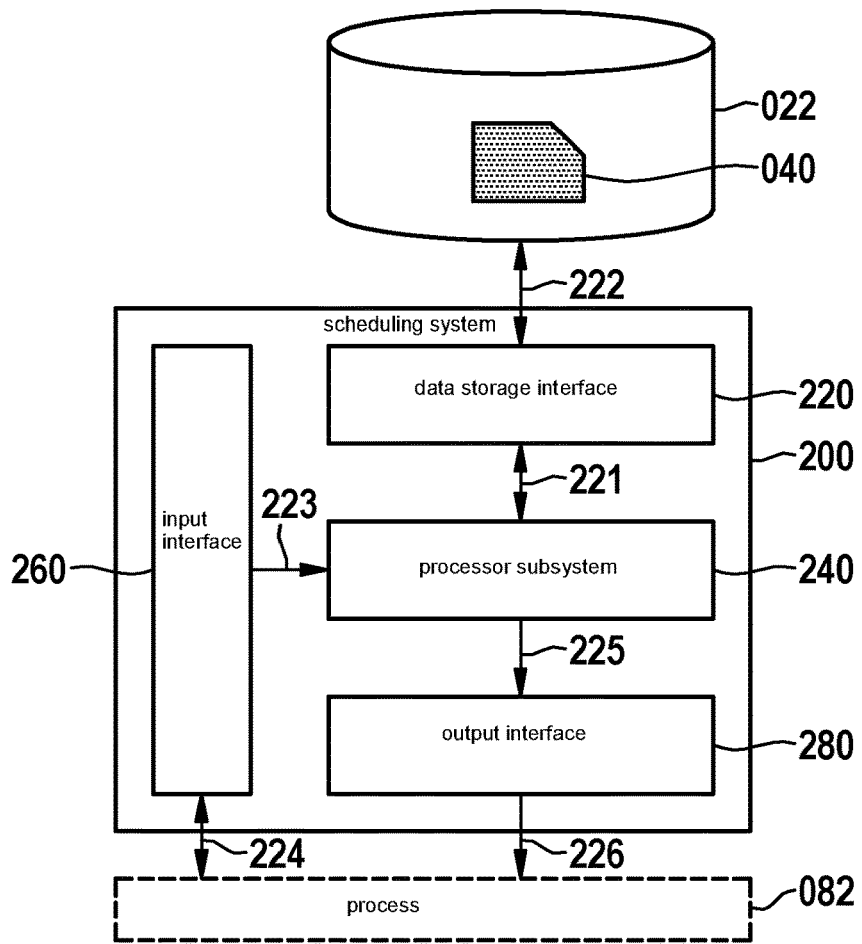
FIG. 2 shows a scheduling system for scheduling jobs, in accordance with an example embodiment of the present invention.

FIG. 2 shows a scheduling system 200 for scheduling jobs of a manufacturing or logistics process 082. The system 200 may comprise a data interface 220 for accessing data 040 representing a priority function. The priority function may be defined to determine a priority value indicating a priority for a job of the process 082. The priority function may be designed to invoke a kernel function. The kernel function may be fixed, e.g., hardcoded, or configurable, for example. For example, instructions for evaluating the kernel function may be accessible via a data interface as described herein. The kernel function may be defined to compare representations of two respective jobs. The priority function may include comparisons by the kernel function of the job with one or more reference jobs. The priority function 040 may have been determined according to a method described herein, e.g., by the system 100 of FIG. 1 or as described elsewhere. System 200 may determine the priority function 040 in addition to applying it, e.g., system 200 may be combined with the system 100 of FIG. 1.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and data storage 021. Storage 022 storing the priority function 040 may be comprised in system 200.

The system 200 may further comprise a processor subsystem 240 which may be configured to, during operation of the system 200, obtain job status data comprising representations of the multiple jobs to be scheduled via an input interface 260, as also described elsewhere. The processor subsystem 240 may be further configured to, during operation of the system 200, evaluate the priority function 040 on the multiple respective jobs to obtain multiple respective priority values. Evaluating the priority function on a selected job of the multiple respective jobs may comprise evaluating the kernel function to compare the selected job to the one or more reference jobs. The processor subsystem 240 may be further configured to, during operation of the system 200, determine a schedule for the multiple jobs based on the priority values. The processor subsystem 240 may be further configured to, during operation of the system 200, output the schedule via an output interface 280, as also discussed elsewhere, to enable the multiple jobs to be carried out according to the schedule.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

The system 200 may comprise an input interface 260 for obtaining job status data 224. The job data typically comprises representations of multiple jobs to be scheduled, and/or status information about devices of the process 082, e.g., their current availability or any other information needed to execute scheduling, e.g., to evaluate the constraints of the scheduler. The system 200 may receive combined job status data 224 containing information about jobs from multiple respective devices of the process 082, or the system 200 may receive respective separate job status data 224 about jobs from several respective devices. The input interface 260 may communicate internally with processor subsystem 240 via data communication 223.

The system 200 may further comprise an output interface 280 for outputting scheduling data 226 representing a schedule to enable the multiple jobs to be carried out in the process 082 according to the schedule. For example, the system 200 may output overall scheduling data 226 relating to jobs of multiple devices to a separate system responsible for letting the devices perform the jobs according to the schedule, or the system 200 may output respective scheduling data 226, e.g., instructions to respective devices of the process 082 to perform respective jobs. The scheduling data 226 may be output in one go as a schedule for all jobs to be scheduled, or can be determined, updated, and/or output progressively. The output interface 280 may communicate internally with processor subsystem 240 via data communication 225.

In some embodiments, the input interface 260 and/or the output interface 280 are embodied as a communication interface configured for communication 224, 226 with one or more other systems. For example, the other system can be a SCADA system, a PLC system, a distributed control system, a batch automation system, or, more generally, any ISA-95 level 2 system. System 200 itself may be implemented as a manufacturing operations system, e.g., a manufacturing execution system, or, more generally, any ISA-95 level 3 system. However, system 200 can also be implemented in or as a level-2 system such as a SCADA system or PLC system, with data 224, 226, being provided directly to manufacturing devices. Generally, a communication interface 260, 280 may be arranged for direct communication with the other system, e.g., using USB, IEEE 1394, or similar interfaces. The communication interface 260, 280 may also communicate over a computer network, for example, a wireless personal area network, an internet, an intranet, a LAN, a WLAN, etc. For instance, communication interface 260, 280 may comprise a connector, e.g., a wireless connector, an Ethernet connector, a Wi-Fi, 4G or 4G antenna, a ZigBee chip, etc., as appropriate for the computer network. Communication interface 260, 280 may also be an internal communication interface, e.g., a bus, an API, a storage interface, etc.

In some embodiments, input interface 260 may be implemented as a sensor interface for directly accessing sensor data 224 of one or more sensors of the process 082. For example, this may the case if system 200 is integrated in a system that is used to directly control one or more devices. Based on the sensor data 224, the status of jobs currently carried out may be determined, based on which it can be determined which jobs are still to be carried out. Other data needed for scheduling, e.g., data needed to evaluate the constraints of the scheduler, may be derived from sensor data 224 as well. The sensor may but does not need to be part of the system 200. The sensor may have any suitable form, such as an image sensor, a lidar sensor, a radar sensor, a pressure sensor, a contain temperature sensor, etc. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the output interface 280 may be implemented as an actuator interface 280 for providing control data 226 to one or more actuators of the process 082. For example, this may be the case if system 200 is integrated in a system that is used to directly control one or more manufacturing devices. The actuators may or not be part of system 200. For example, an actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc.

Using such control data 226 the devices may be made to carry out the jobs according to the schedule.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Figure 3:
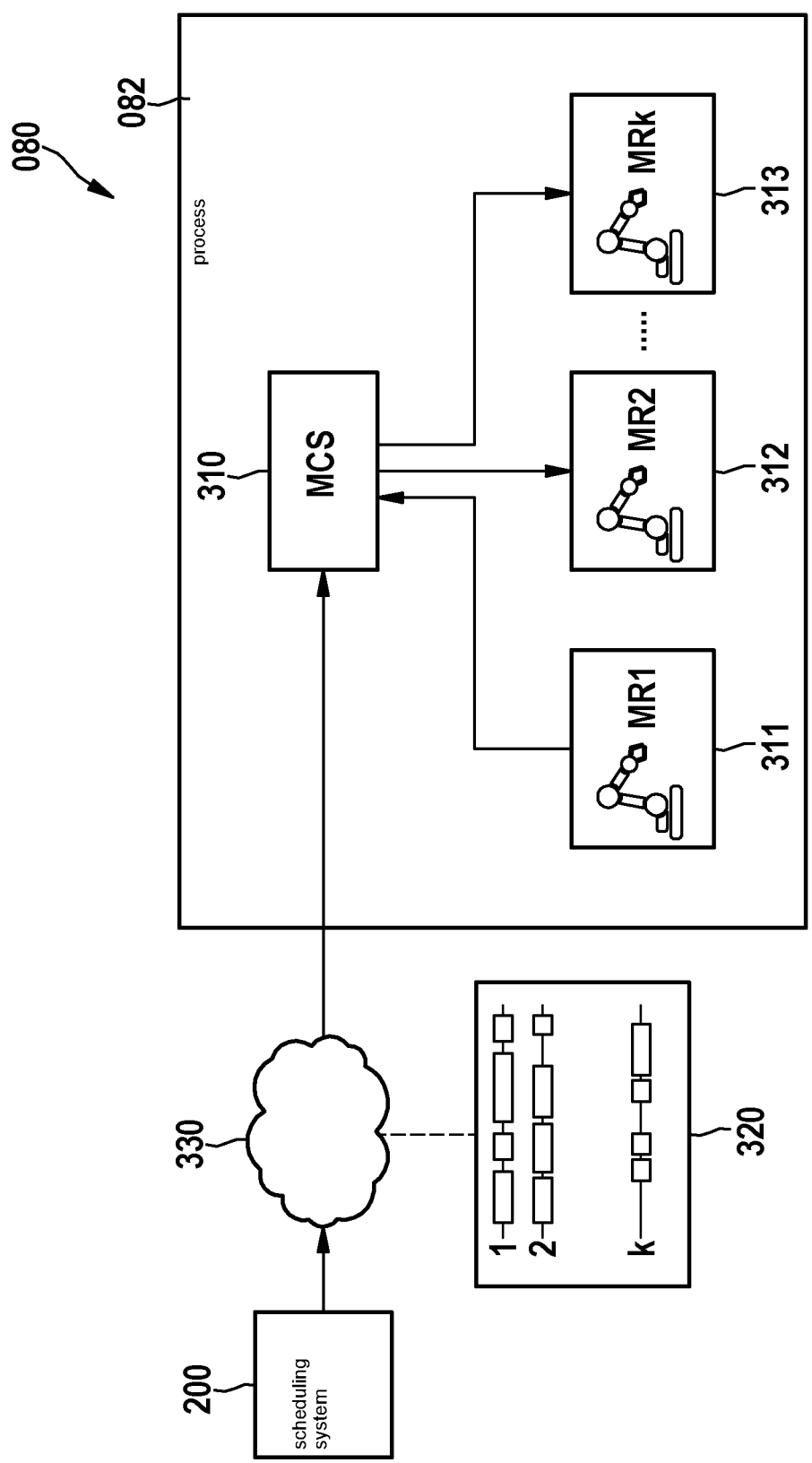
FIG. 3 shows a manufacturing system, in accordance with an example embodiment of the present invention.

FIG. 3 shows an example of the above, in that scheduling system 200 is shown to be part of a manufacturing system 080. In this example, scheduling system 200 is a manufacturing operations system 200, e.g., a manufacturing execution system. As is conventional in manufacturing, such a system may be configured to provide real-time planning of the manufacturing process 082. A manufacturing operation system is also sometimes referred to as a level-3 system, e.g., in the context of the ISA-95 standard.

In particular, in this example, the manufacturing process 082 is controlled and/or monitored by a manufacturing control system 310. For example, system 310 can be a supervisory control and data acquisition (SCADA) system, a programmable logic controller (PLC), a distributed control system (DCS), or a batch automation system (BAS). There can be multiple such manufacturing control systems, e.g., controlling and/or monitoring respective parts of the manufacturing process 082. Manufacturing control systems are also sometimes referred to as level-2 systems, e.g., in the context of the ISA-95 standard.

The manufacturing control system 310 is configured to monitor and/or control one or more manufacturing devices 311, 312, 313, also referred to as manufacturing machines. As an illustrative example, manufacturing robots are shown; however, other types of manufacturing devices are also possible. Generally, a job may be a task that is assigned to be carried out by a particular unit of the process, e.g., a single manufacturing device. Typically, a unit can also carry out only one job (or a limited number of jobs) at the same time. Thus, the manufacturing process 082 may be scheduled in terms of jobs as atomic tasks carried out by the manufacturing devices 311-313. For example, the number of manufacturing devices for which a schedule is determined as described herein, may be at most or at least 10, at most or at least 50, or at most or at least 100. The respective manufacturing devices 311-313 may each be identical, but can also differ from each other.

As illustrated in the figure, the system 200 may be configured to use the techniques described herein determine a schedule 320 for scheduling jobs of the manufacturing process 082, e.g., respective jobs may be assigned to be performed by the respective manufacturing devices 311-313, at respective points in time. The figure illustrates the schedule 320 being provided by the system 200 to the manufacturing control system 310 for controlling the manufacturing such that the jobs are carried out by the device 311-313 according to the schedule, for example, using a computer network 330. Thus, the manufacturing system 080 benefits from the more optimal schedule determined by the system 200, allowing it to perform manufacturing faster, with increased throughput, and/or with reduced waste of resources.

The provided techniques are applicable to various types of manufacturing processes 082. The provided techniques are especially suitable to relatively complex manufacturing processes, and processes using relatively expensive equipment. In such cases, it is particularly important to determine an efficient schedule in a computationally efficient way.

In a preferred embodiment, the manufacturing process 082 is a process for semiconductor production, e.g., in a foundry. For example, the manufacturing process can be a semiconductor device fabrication process used to manufacture a semiconductor device or an integrated circuit comprising multiple such semiconductor devices. The process may be for producing an electronic circuit on a wafer of semiconducting material such as silicon.

As another example, the manufacturing process 082 can be a process for producing a vehicle or components thereof, etc. The provided techniques are also applicable to other types of systems that apply jobs according to a schedule, such as logistics systems.

It is noted that, although systems 200, 310, 311-313 comprised in the manufacturing system 080 are illustrated here as separate devices, it is possible to combine several such systems into a single device. For example, system 200 may be combined with system 310 in a single device; systems 310-313 may be combined in to a single device, or both. It is also possible to implement the scheduling as described herein not at the level of a manufacturing execution system, but at the level of a manufacturing control system, for example. Many variants and alternatives will be envisioned by the skilled person, in view of the disclosure herein.

Figure 4:
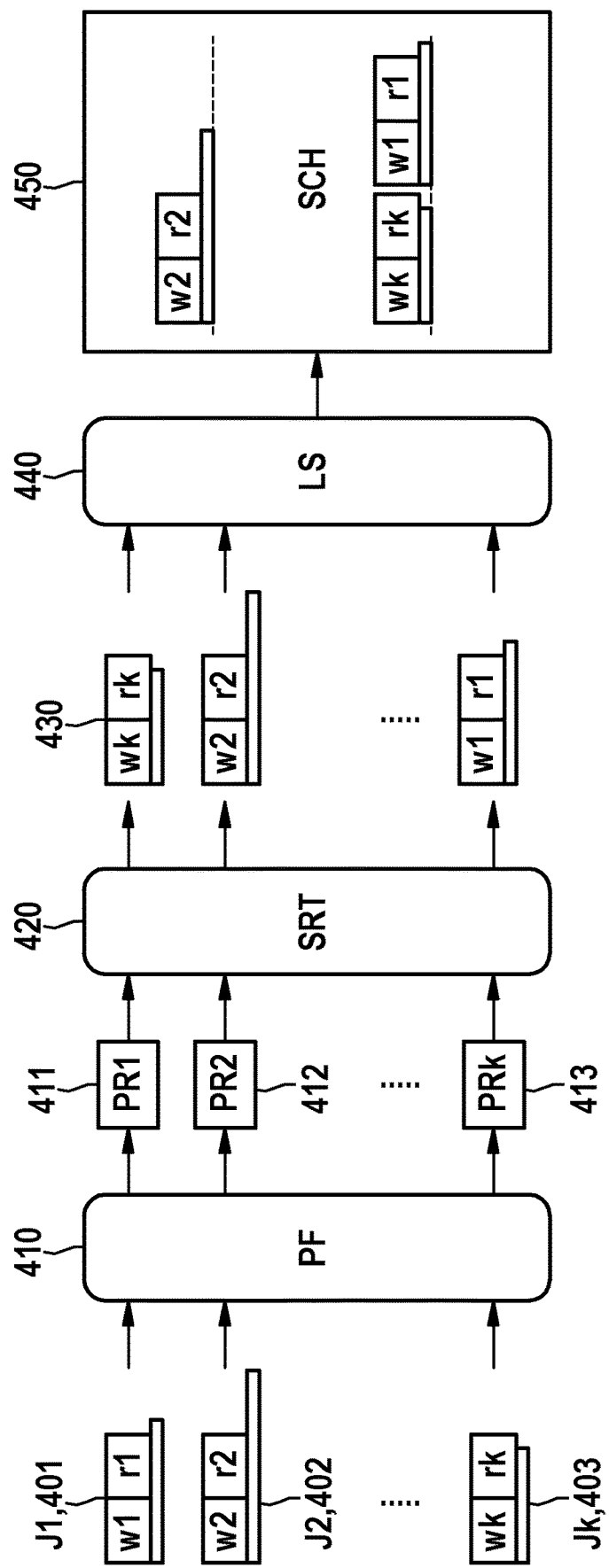
FIG. 4 shows a detailed example of scheduling according to a priority function, in accordance with an example embodiment of the present invention.

FIG. 4 shows a detailed, yet non-limiting, example of scheduling according to a priority function.

Illustrated in the figure is a set of multiple jobs to be scheduled. Shown for illustrative purposes are jobs J1, 401; J2, 402; and Jk, 403. Interestingly, the scheduling techniques described with respect to this figure, can be applied to scheduling problems that comprise a large number of jobs Ji, for example, the number of jobs can be at least 1000, at least 10000, or at least 100000.

Typically, a job is represented by one or more attributes, such as a processing time (illustrated by the respective beams in the figure), a release date r1,r2,rk, and a weight w1,w2,wk indicating the importance of the job. Mathematically, a sequence of k jobs may be described by column vectors $D_1, \ldots, D_k$ of attributes. Thus, the set of jobs to be scheduled may be represented as a matrix D whose columns are $D_j$ where j ranges from 1 to k. For example, jobs J1, J2, ... Jk may be represented as:

$$D = \begin{bmatrix} p_1 & p_2 & \ldots & p_n \\ w_1 & w_2 & \ldots & w_n \\ r_1 & r_2 & \ldots & r_n \end{bmatrix}.$$

The jobs Ji may be scheduled for execution on a number of m devices, e.g., robots. The devices can be all identical, for example. As an example, a scheduling problem may be denoted as $Pk|r_j|\Sigma_j w_j C_j$, where there are k parallel identical machines, e.g., processors or robots; job release dates $r_j$; and weights $w_j$. Thus, such a job may be described by a column vector $D_j=(p_j, r_j, w_j)^T$, where $p_j$ is the processing time of job j.

An objective of the schedule can for example be to minimize, at least approximately, the sum of weighted completion times $C_j$, e.g., to minimize the average weighted completion time.

In the example of this figure, the jobs are scheduled based on a priority function PF, 410. The priority function may be defined to determine a priority value indicating a priority for a job of the manufacturing or logistics process. Typically, the priority value is real-valued, e.g., positive real-valued. Lower values may be used to denote higher priority, but the converse is also possible. The priority function PF may receive a representation of the job. By applying the priority function PF to the respective jobs Ji, respective priority values PR1, 411, PR2, 412, ..., PRk, 413, may be obtained.

A scheduling procedure may be used that schedules the jobs according to their respective priority values PRi. In particular, such a scheduling procedure may be based on sorting the jobs Ji according to their respective priority values PRi. The figure shows a sorting operation SRT, 420, that determines a sorting of the jobs Ji according to their priority values, e.g., from highest to lowest priority. In the example of the figure, the sorting has resulted in job Jk, followed by job J2, followed by job J1. The sorting 430 of the jobs may be regarded as a permutation of the original list 401-403 of jobs. It is not necessary that the sorting 430 is explicitly and completely determined, e.g., it is also possible to repeatedly scan through the list of priority values PRi to find a next remaining job with highest priority.

A scheduling procedure LS, 440, may determine a schedule based on the jobs sorted according to their priority values PRi. For example, the scheduling procedure LS may not otherwise use the priority values. An advantage of scheduling based on an ordering of priority values, is that the priority values need only be determined once, e.g., the scheduling does not need to apply the priority function again. This means that it is possible to use a relatively complex priority function PF and still keep efficient scheduling.

Preferably, the priority function PF does not take into account constraints imposed by the manufacturing or logistics process at hand, such as availability constraints of the machines, interdependencies between the jobs, etcetera. Such interdependency constraints may for example indicate that one or more jobs need to be processed before one or more other jobs, and/or that one or more jobs cannot be processed at the same time. Such constraints, also called feasibility conditions, are taken into account in the scheduling LS of the jobs based on the computed priority values. This has the advantage that the feasibility conditions can be modified as necessary without affecting the way the priority function PF is computed. This is particularly important in complex industrial processes. For example, during use of the system, the constraints may change, but the same priority function PF and/or priority values PRi may be used to update the schedule. Or, at least, the priority function may be determined, e.g., updated, in such a way that the applicable constraints are accessed only indirectly in that they may be used to determine a target schedule that is used to determine the priority function (for example, using scheduling operation LS), but are not otherwise accessed directly. In this way, the complexity of the constraints may have little to no effect on determination of the priority function, which may thus remain efficient even if the constraints are complicated, and, since it does not need to take the constraints into account, can be trained accurately on relatively little data.

For example, the procedure LS used to schedule the jobs may apply list scheduling. List scheduling may take as input the ordered set of jobs 430, in other words, a permutation 430 of the set of jobs to be scheduled, and may iteratively select a job from the ordered set of jobs 430 and schedule it as early as possible, taking into account the constraints imposed by the manufacturing or logistics process. For example, a list scheduling procedure LS may be implemented given a permutation $\pi(1), \ldots, \pi(n)$ on indices $\{1, 2, \ldots, n\}$ of the set of jobs to be scheduled by, given $\pi$, for $t=1, \ldots, n$, scheduling job $\pi(t)$ as early as possible into one of the available time slots on one of the machines taking into account the release dates, e.g., processing can start no earlier than $r_{\pi(t)}$, e.g.:

Step 1. Initialize the counter of jobs: $t:=1$.

Step 2. Pick the job $\pi(t)$ and assign it to a machine which can start processing job $\pi(t)$ as early as possible while satisfying all feasibility conditions.

Step 3. Increase the counter of jobs: $t:=t+1$.

Step 4. If $t \leq n$, then go to Step 2, else return the schedule.

Scheduling procedure LS may result in a schedule SCH, 450, in which respective jobs are assigned to particular resources (e.g., machines) for execution at particular times. As also discussed elsewhere, scheduling procedure LS may only output a particular schedule SCH and/or may progressively output parts of the schedule, as needed. In some cases, e.g., for the purpose of determining a priority function, it may be sufficient for scheduling procedure LS to output just the order of the jobs of the schedule SCH, e.g., the list of scheduled jobs sorted by the starting times at which they are scheduled. The mapping from permutations to feasible schedules determined by the scheduling procedure LS may be denoted by L. At least if list scheduling is used, it may be noted that for each scheduling task, it is possible for priority function PF to output priority values that give rise to a permutation $\pi$, 430 for which $L(\pi)$ is an optimal schedule.

Some possibilities for priority function PF are now discussed that are conventional. These priority functions do not use a kernel function. For example, these priority functions may be used in relation to the scheduling problem $Pk|r_j|\Sigma_j w_j C_j$:

earliest release date (ERD): schedule the jobs in nondecreasing order of $r_j$. This priority function is optimal e.g. for $Pk|r_j, p_j=\text{const}, w_j=\text{const}|\Sigma_j w_j C_j$.

shortest processing time (SPT): schedule the jobs in nondecreasing order of $p_j$. This priority function is optimal for $1||\Sigma C_j$.

weighted shortest processing time (WSPT): schedule the jobs in nondecreasing order of $p_j/w_j$. This priority function is optimal for $1||\Sigma w_j C_j$.

maximum weight (MW): schedule the jobs in nonincreasing order of $w_j$. This priority function is optimal for $1|p_j=\text{const}|\Sigma_j w_j C_j$.

These rules can be described as posynomials as follows:

| Rule | Description | Posynomial $\varphi(p_j, w_j, r_j)$ |
| --- | --- | --- |
| Earliest release date (ERD): | $r_{\pi(j)} \leq r_{\pi(j+1)}$. | $r_j$ |
| Shortest processing time (SPT): | $p_{\pi(j)} \leq p_{\pi(j+1)}$. | $p_j$ |
| Weighted shortest processing time (WSPT): | $p_{\pi(j)}/w_{\pi(j)} \leq p_{\pi(j+1)}/w_{\pi(j+1)}$ | $p_j \cdot w_j^{-1}$ |
| Maximum Weight (MW): | $w_{\pi(j)} \geq w_{\pi(j+1)}$ | $w_j^{-1}$ |

Interestingly, it is also possible to use multiple respective priority functions to determine a schedule. For example, the multiple priority functions may comprise one or more priority functions determined as described herein, and/or one or more other priority functions, e.g., standard heuristics. To this, end, respective schedules SCH may be determined according to the respective priority functions as described herein; and a schedule may be selected among the respective schedules SCH. For example, an objective or loss function may be computed for the respective schedules, e.g., minimal total weighted completion time or similar. This way, it is possible to use multiple priority rules determined using the techniques described herein, and use one that works best in the current setting.

Figure 5A:
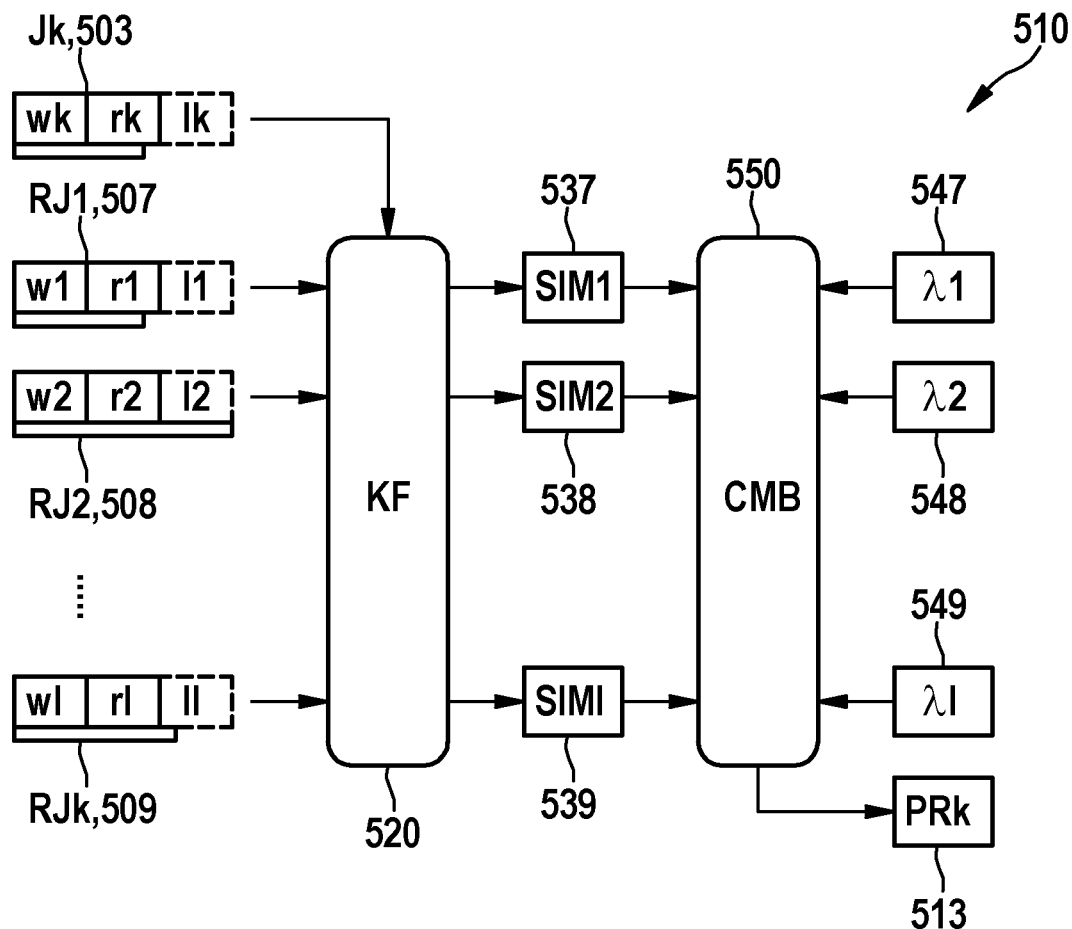
FIG. 5A shows a detailed example of a priority function using a kernel function, in accordance with an example embodiment of the present invention.

FIG. 5A shows a detailed, yet non-limiting, example of an evaluation 510 of a priority function that uses a kernel function KF, 520.

As is conventional, a kernel function KF takes two inputs and essentially compares the two inputs in the sense of computing an inner product between the two elements in an implicit feature space. Kernel functions are sometimes referred to as positive-definite kernels. Kernel function KF is typically symmetric, e.g., K(x,y)=K(y,x) for all x, y. Kernel function KF is typically also positive semi-definite. Several definitions of positive semi-definiteness are possible. One possible definition of positive semi-definiteness is that given $c_1, \ldots, c_n$, for any $x_1, \ldots, x_n$, $\Sigma_i \Sigma_j c_i c_j K(x_i, x_j) \geq 0$. The kernel function can be positive definite, meaning that $\Sigma_i \Sigma_j c_i c_j K(x_i, x_j)=0$ implies $c_1 = \ldots = c_n = 0$, but this is not needed.

The kernel function KF may be defined to compare representations of two respective jobs. That is, the kernel function KF may compute an inner product between the representations of the jobs in an implicit feature space.

Computing the kernel function KF may comprise determining respective attribute vectors representing the respective jobs, and computing a kernel of the respective attribute vectors. The kernel function applied to the attribute vectors can be a conventional kernel function, e.g., a polynomial kernel, a Gaussian kernel, an RBF kernel, a sigmoid kernel, etc.

Various advantageous options for the attribute vectors are possible. The attribute vector may comprise a release date, a weight, and/or a processing time of the job. Instead or in addition, the attribute vector may contain logarithms of the respective attributes. The use of logarithms in the kernel functions may correspond conceptually to the use of posynomials in priority rules as discussed w.r.t. FIG. 4. The combination of the attributes themselves and their logarithms was found to work particularly well.

In addition to including attributes of the jobs themselves, the attribute vector may also include one or more attributes obtained by computing an aggregate of a job attribute over the set of jobs to which the job belongs. For example, the attribute vector may include a sum or average of an attribute, e.g., weight, processing time, or release date, over all jobs to be scheduled, or over all jobs excluding the selected job.

For example, mathematically, the attribute vector may be denoted as $\tau_D(x)=\xi(x,D)$, where $\xi$ is a vector function, x is the selected job, and [D] is the set of jobs, e.g., the jobs be scheduled, e.g., $[D]=\{D_j: j=1, \ldots, n(D)\}$.

For example, the following choice of $\xi$ includes logarithms of respective attributes, allowing to find a posynomial-type rule over the original space of job attributes (that may optionally be transformed to make them positive):

$\xi(x,D)=\log x_1, \ldots, \log x_m)$.

For example, a priority rule based on this kernel function may be defined by $\Sigma_{i=1}^m \alpha_i \log x_i$, corresponding to a rule defined by a posynomial $\Pi_{i=1}^m x^{\alpha_i}$.

As another example, aggregates of job attributes can be included as follows, thus including more information of how each job is related to the context given by the respective problem instance (in this example using a logarithm, but this is not needed):

$\xi(x, D) = (\log x_1, \ldots, \log x_m, \log y_1, \ldots, \log y_m)$, $$y = \frac{1}{n(D)-1}\left(\sum_j D_j - x\right).$$

In another example, linear rules in the original space of attributes are combined with posynomial-type rules:

$\xi(x,D)=(x,y,\log x,\log y)$, where the log is applied component-wise to the vector.

Instead of or in addition to computing a kernel over the job attributes, the computation of the kernel function KF can also include the computation of a degree of similarity between the sets of jobs corresponding to the respective inputs. For example, the degree of similarity may be computed using an intersection kernel. For example, the jobs may be represented as regions, e.g., spheres, in Euclidean space, and an intersection between the sets of regions corresponding to the respective sets of jobs may be computed. For example, the following intersection kernel may be used:

$$\tilde{K}(M_1, M_2) = \frac{vol(M_1 \cap M_2)}{\sqrt{vol(M_1) \cdot vol(M_2)}}.$$

for any nonempty measurable subsets $M_1$ and $M_2$ of a Euclidean space, where vol(·) denotes the volume. This is a normalized variant of the conventional intersection kernel.

The degree of similarity may be computed for volumes corresponding to the respective sets of jobs, from which the selected job may optionally be excluded. Excluding the job itself allows to better distinguish between jobs of the same instance because it leads to differences for jobs from the same set of jobs with different attribute vectors.

Mathematically, a representation of a job may for example be defined by a function $\tau$ as follows:

$\tau_D(x)=(\xi(x,D),[D]\setminus\{x\})$, where $\xi$ is the attribute vector function, and [D] the set of jobs. Thus, the representation may comprise the attribute vector $\xi(x,D)$ and the set of columns of D (possibly, excluding the given vector x), e.g., as a tuple.

A kernel function over this representation that uses both an attribute vector and a degree of similarity of job sets can for example be computed as:

$K((z_1,S_1),(z_2,s_2))=K_0(z_1,z_2)+\gamma\tilde{K}(\cup_{p\in S_1}B(p,r),\cup_{p\in S_2}B(p,r))$, where $K_0$ is a positive semidefinite kernel function over the Cartesian product of two copies of the Euclidean space containing the codomain of $\xi$, $\gamma$ is a positive parameter, and B(p,r) denotes the ball centred at p with radius r. Both $\gamma$ and r may be given parameters, e.g., are typically not learned as part of determining the priority function. Typically, $K_0$ and $K_{int}$ are positive semidefinite kernels, so K is a positive semidefinite kernel as well.

Kernel function KF K may be computed approximately using e.g. Monte-Carlo methods. Interestingly, the use of Monte Carlo is effective in this setting because the set of attributes of a job is relatively small, for example, at most three or at most six attributes.

The inclusion of information about other jobs, for example, in the form of attribute aggregates and/or degrees of similarity, provides an advantage over standard priority functions. When using only attributes of the job itself, if job $j_1$ of instance $D^1$ and job $j_2$ of instance $D^2$ share the same vector of attributes, e.g., if $D_{j_1}^1 = D_{j_2}^2$, then $\varphi(D_{j_1}^1) = \varphi(D_{j_2}^2)$, in other words, the priority function cannot distinguish them. This means that heuristics based on such myopic rules can miss better solutions which can be found when a priority function is dependent also on the entire instance in question. The use of aggregates and/or similarities allows to make mapping $\tau$ depend on both the attributes of a job and the instance which the job belongs to.

Interestingly, the inventors envisaged to use the kernel function K, KF, to compute a priority function. Given a representation x of a reference job, the function $y \mapsto K(x,y)$ is a function taking as input a representation of a job, and providing as output the result of comparing the job y to the reference job x according to the kernel function. The inventors envisaged that a priority function PF for a job may be constructed by combining one or more such respective comparisons of the job with respective reference jobs. In the example of this figure, the priority function is constructed as a function from the class of linear combination of comparisons with respective reference jobs. Shown is a job Jk, 503, for which a priority value PRk, 513, is to be determined. Also shown are a number of reference jobs RJ1, 507, RJ2, 508, . . . , RJI, 509; in this example, three.

The priority function may be evaluated by performing respective comparisons of the job Jk to the respective reference jobs RJi according to the kernel function, e.g., the kernel function may be applied respectively to the job and the respective reference jobs. As a result, respective similarity values SIM1, 537, SIM2, 538, . . . , SIMI, 539, may be determined, e.g., respective inner products. The respective similarity values may be combined according to a combination operation CMB, 550, that in this example computes a linear combination of the respective similarity values SIMI according to respective coefficients $\lambda 1$, 547, $\lambda 2$, 548, . . . , $\lambda I$, 549, resulting in the priority value PRk.

Mathematically, the above priority function may be written as $\langle h(\varphi), \kappa(x) \rangle$, where $h(\varphi)$ is an element of the so-called reproducing kernel Hilbert space (RKHS) of K, and where $\kappa$ is the feature map of K. In this example, $h(\varphi) = \Sigma_i \lambda_i \kappa(x_i)$, where $\lambda_i$ are the coefficients and $x_i$ the representations of the respective reference jobs. It is noted that the feature map $h(\varphi)$ corresponding to the priority function, does not need to be explicitly evaluated; instead, the priority function may be evaluated in terms of invocations $K(x_i, x)$ of the kernel function using the respective representations of the reference jobs. However, for some types of kernel functions, explicitly representing the reference jobs $x_i$ and job x in feature space may also be possible and can provide an alternative way of evaluating the priority function.

Figure 5B:
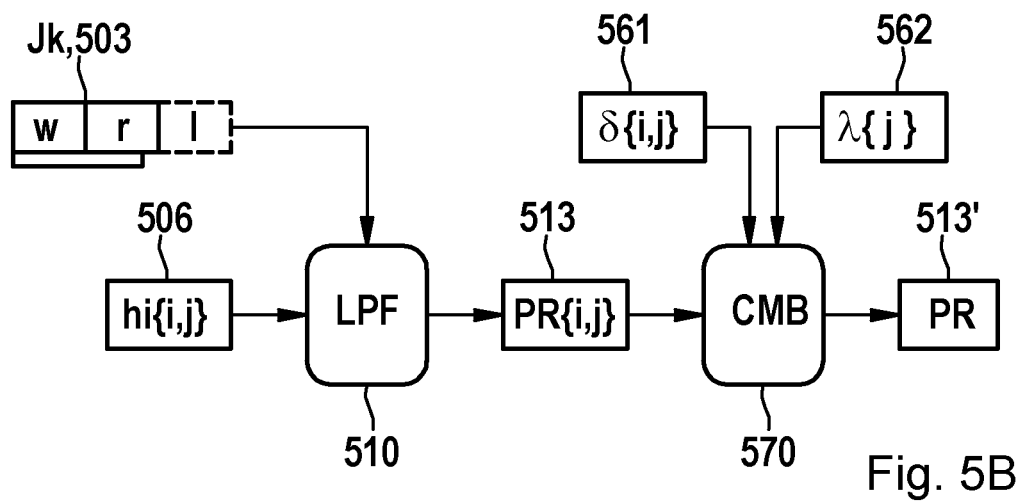
FIG. 5B shows a detailed example of a priority function using a kernel function, in accordance with an example embodiment of the present invention.

FIG. 5B shows a detailed, yet non-limiting, example of a priority function using a kernel function. This example is based on the example of FIG. 5A, but uses a broader class of priority functions.

In this example, in order to compute priority value PR, 513', for a job Jk, 503, first, multiple respective linear combinations hi{i,j} of comparisons, 506, of the job Jk with reference jobs are computed using the linear priority function LPF, 510, of FIG. 5A. This results in respective priority values PR{i,j}, 513. The respective priority values PR{i,j} are then combined, in a combination operation CMB, 570, into the priority value PR.

In general, various different non-linear combination operations CMB may be used to increase expressivity of the priority function. In this example, a combination operation CMB of a particular class is used. A procedure for determining priority functions of this class is provided in FIG. 7.

Priority value PR may be determined based on one or more decision boundary differences. A decision boundary difference is computed by computing a difference between a constant $\delta_i^j$ and a priority value $\langle h_i^j, \kappa(x) \rangle_{RKHS}$, PR{i,j}. The constant $\delta\{i,j\}$, 561, is defined as part of the priority function. These decision boundary differences may be combined to obtain the priority value PR. For example, based on one or more of the decision boundary differences, one or more minimal decision boundary differences may be computed. A minimal decision boundary difference $\varphi_j(x)$ may be computed as a minimum of respective decision boundary differences. For example:

$$\varphi_j(x) = \min_{i=1,\ldots,a_j} \delta_i^j - \langle h_i^j, \kappa(x) \rangle_{RKHS}.$$

These minimal decision boundary differences may be combined to obtain the priority value PR, for example, by computing a minimum of the respective minimal decision boundary differences, weighed by respective weighting factors $\lambda\{j\}$, 562, given as part of the priority function, for example, $$\varphi(x) = \min\left\{\lambda_j \varphi_j(x) : j = 1, \ldots, \max_{D \in E} n(D)\right\}.$$

As also shown elsewhere, by adding a combination operation CMB, a broader and thus more expressive class of priority functions can be used to schedule jobs. In particular, using priority functions as described with respect to this figure, it can be guaranteed for a set of given training instance that the priority function completely reproduces the respective target solutions (at least if all jobs are distinct).

Figure 6A:
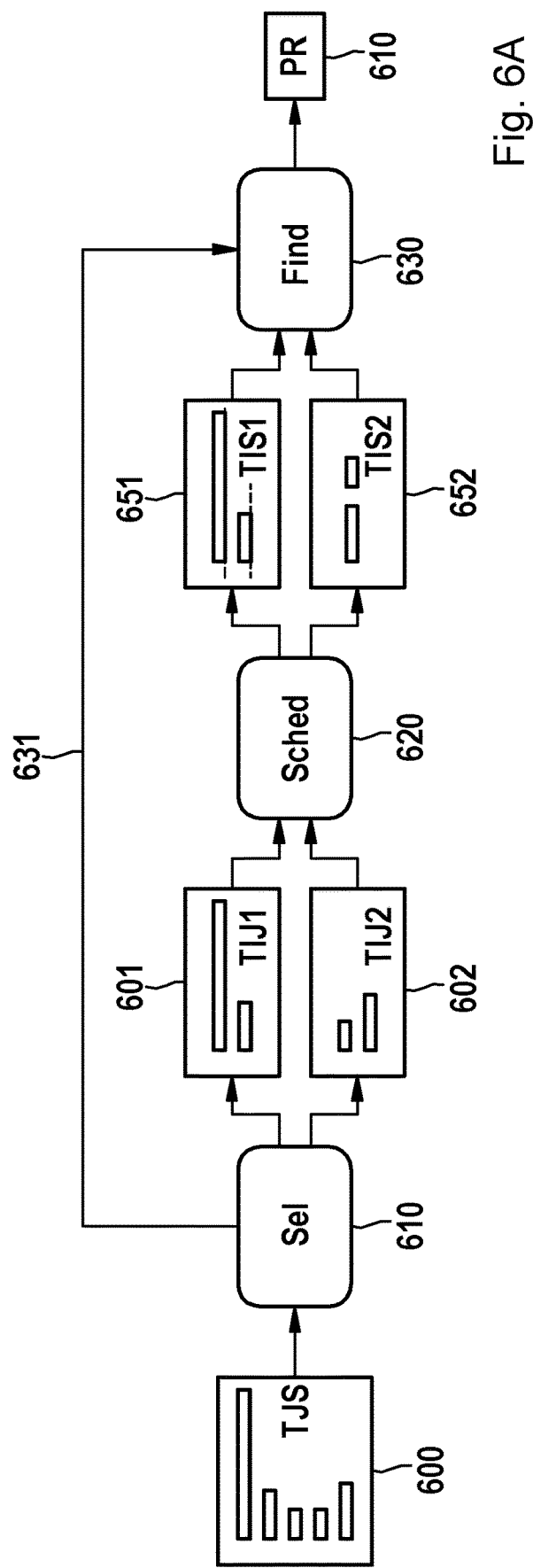
FIG. 6A shows a detailed example of determining priority functions, in accordance with an example embodiment of the present invention.

FIG. 6A shows a detailed, yet non-limiting, example of determining one or more priority functions that use a kernel functions.

In this example, priority functions are determined based on a set of multiple training jobs TJS, 600. No target schedule is typically known for the full set of training jobs TJS (or, at least it may not be used according to this example). For example, it may be computationally too expensive to compute an optimal or near-optimal schedule for the full set of jobs, as also discussed below.

From the set of multiple training jobs, one or more training instances may be determined. A training instance may be determined by first, in a selection operation Sel, selecting a set of jobs TIJ1, 601, TIJ2, 602, from the set of training jobs TJS. For example, the jobs of a training instance TIJi may be selected randomly from the set of training jobs. The respective sets of training instance jobs TIJ1, TIJ2 may be selected to be disjoint, but this is not necessary. For example, a sample size indicating the number of training instances to be generated, and an instance size indicating a number of jobs of a training instance TIJi may be fixed or given as hyperparameters. It is not necessary for all instances to have the same size. The number of jobs of a training instance is typically much smaller than the total number of training jobs TJS, for example, at most 10% or at most 5% of the size.

Interestingly, the training instances are selected to be small enough that it is feasible to determine a target schedule, as described below. For example, the sample size for a training instance TIJi, or for all training instances, may be at most or at least 25, at most or at least 100, or at most or at least 250 jobs. The instance size may be at most or at least 10, at most or at least 20 or at most or at least 50 training instances, for example. The priority function may be optimized essentially to reproduce the target schedules on the training instances.

The figure shows a scheduling operation Sched, 620 that may be applied to determine target schedules TIS1, 651, TIS2, 652, for the sets of jobs TIJ1, TIJ2, of the respective training instances. A target schedules TISi may define at least an ordering of the jobs TIJi; it may also specify additional scheduling information, such as starting times, an assignment of jobs to resources, etc; but this additional scheduling information is not needed to determine the priority function.

There are several ways to implement scheduling operation Sched. In some embodiments, the target schedule may be determined by a procedure that determines an optimal or near-optimal schedule, using conventional techniques. Interestingly, in many cases, it is not feasible to apply this procedure to the full set of training jobs TJS, for example, because this may be too time-consuming. Since the training instances TIJi are smaller, it is however possible to apply the scheduling operation to them, and thus to use them to determine a priority function as described herein. The priority function may then be used for scheduling of large numbers of jobs, e.g., as described with respect to FIG. 4. Thus, by learning a priority function to effectively reproduce the optimal or near-optimal target schedule, it may be enabled to, at least approximately, reproduce the optimal or near-optimal scheduling procedure for large sets of jobs. Scheduling using the priority function may be regarded as providing a fast heuristic algorithm that approximates the optimal or near-optimal scheduling procedure.

However, it is not needed for scheduling operation Sched to output an optimal or near-optimal schedule. In some embodiments, scheduling operation Sched determines a schedule for a set of training jobs TIJi by performing each of the following zero or more times:
- determining the schedule according to a given priority function, e.g., a known priority function or a previously used priority function, e.g., using the techniques of FIG. 4;
- determining the schedule according to randomly generated priorities for the respective jobs, e.g., using the techniques of FIG. 4;
- determining the schedule using a conventional heuristic scheduling algorithm.

Accordingly, one or more schedules may be determined for a set of training jobs TIJi, and target schedule TISi may be selected as a best schedule (according to some metric) among the determined schedules. For different training instances, it may differ which scheduling operation returns the best schedule. The priority function may be determined as a single priority function that attempts to reproduce the respective best target schedules TISi for the respective training instances. Thus, for example, a known set of priority rules may be extended by additional priority rules that effectively combine and generalize existing rules.

Given the one or more training instances comprising respective sets of multiple training jobs TIJi ordered according to respective target schedules TISi, a priority function finding operation Find, 630, may be performed to determine a priority function PR, 610. As also discussed elsewhere, operation Find may select the priority function PR from a class of priority functions determined in terms of a kernel function. The kernel function may be defined to compare representations of two respective jobs, not necessarily of the same problem instance. A priority function of the class of priority functions includes one or more comparisons according to the kernel function with respective reference jobs. The priority function PR may be determined by performing an optimization. The optimization may be configured to select the priority function PR from the class of priority functions. Given an earlier job that is ordered before a later job according to a target schedule TISi, the optimization may be configured to penalize the priority function for assigning a higher priority to the later job than to the earlier job. Several concrete ways of determining such priority functions are described, e.g., with respect to FIG. 6B and FIG. 7.

As indicated by arrow 631 in the figure, the selecting Sel, scheduling Sched, and priority function determining Find may be repeated multiple times to determine multiple priority functions. For example, jobs may be scheduled using the multiple priority functions, as described, e.g., with respect to FIG. 4. Thus, from the collection of the constructed priority rules, the priority rule may be chosen which delivers the best solution, e.g., under the list scheduling procedure, for a problem instance in question. The multiple priority functions may each use the same kernel function and/or be from the same class of priority functions and/or be determined according to the same procedure Find, but this is not needed.

An example implementation of the above procedure for determining priority functions is provided below. Here, E is used to denote a set of one or more training instances TIJi, TISi. A training instance is represented in the algorithm below by a matrix $D=(D_1, \ldots, D_{n(D)})$, where the columns represent training jobs TIJi that are enumerated according to the target solution TISi.

---

Algorithm for determining priority functions

Input: Training jobs TJS representing a large instance D* of the scheduling problem
Algorithm A for determining target schedules TISi, e.g., using a list scheduling routine and/or an objective function in the form of a procedure for computing a value representing optimality of a schedule
Hyperparameters: The number of rules, the sample size, and the instance size for instances in a training instance TIJi (usually much smaller than the number of columns in the original instance).
Output: A set of priority rules.
Step 1. Repeat a given number of times (equal to the number of rules to be generated):
Using Sel, generate the given number of instances being subsets of D*, each of the given instance size. Let $\tilde{E}$ be the obtained set of instances.
$E:=\emptyset$
For each $\tilde{D} \in \tilde{E}$:
Apply Algorithm A, Sched, to $\tilde{D}$ to find a target solution
Sort the columns of $\tilde{D}$ in the order given by the target solution.
Let D be the matrix obtained by sorting. Add $\tilde{D}$ to E.
Apply an algorithm Find for finding a priority rule to the training set E.
Step 2. Return the collection of rules found at Step 1.

---

Figure 6B:
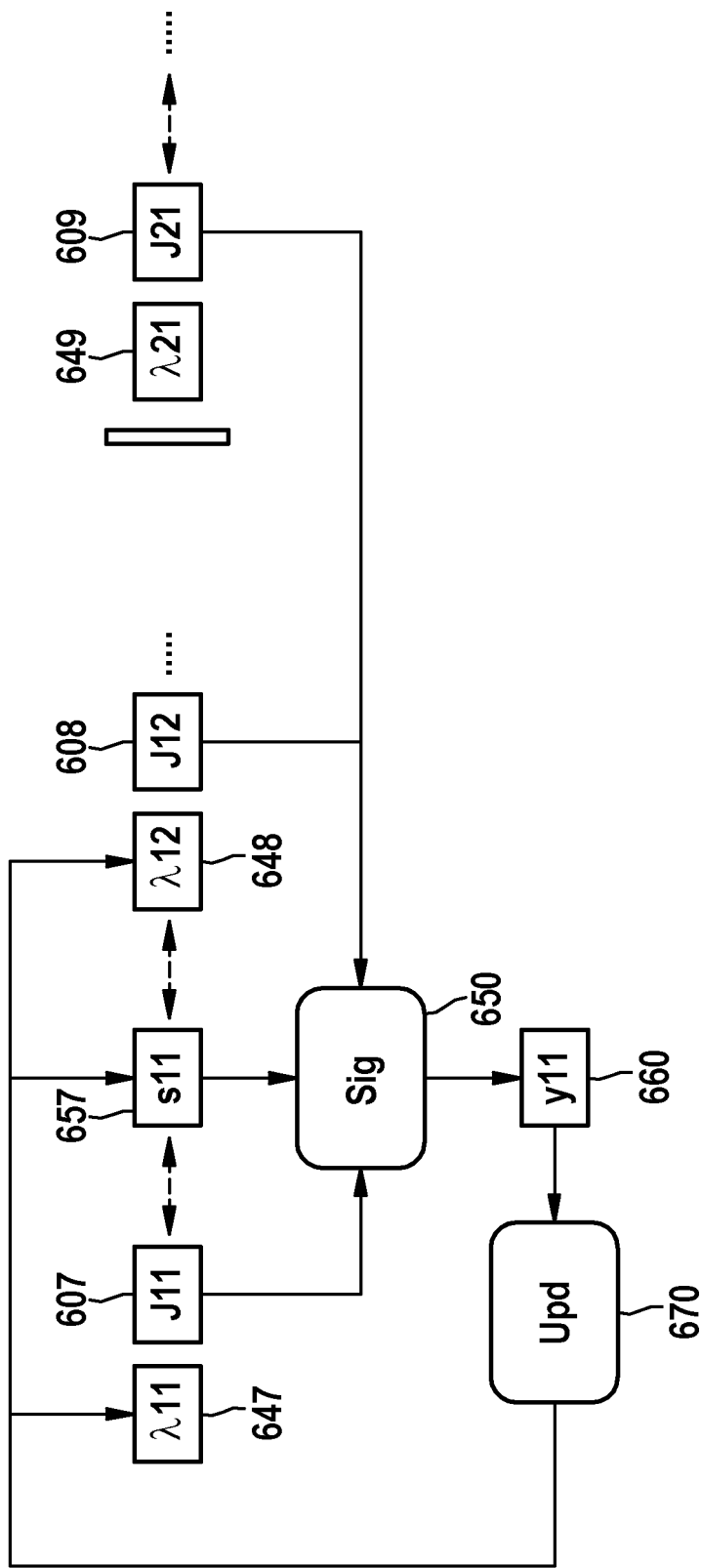
FIG. 6B shows a detailed example of determining a priority function, in accordance with an example embodiment of the present invention.

FIG. 6B shows a detailed, yet non-limiting, example of determining a priority function. This example shows an optimization procedure that can be used to determine a priority function that is a linear combination of comparisons with respective reference jobs. For example, a priority function determined according to this figure may be evaluated as described with respect to FIG. 5A.

Shown in the figure are a number of training instances, that each comprise multiple jobs according to a target schedule. In particular, shown are jobs J11, 607, and J12, 608, of a first training instance, and a job J21, 609, of a further training instance. Also shown are respective coefficients for the respective jobs: coefficient λ11, 647 for job J11; coefficient λ12, 648 for job J12; and coefficient λ21, 649 for job J21. The training may comprise determining the coefficients for the respective jobs. The priority function may be determined as a linear combination of the respective jobs according to the respective coefficients.

To penalize the priority function for assigning a higher priority to later jobs than to earlier jobs, a loss function can be optimized that is defined over respective pairs of consecutive earlier and later jobs of the training set. Thus, the loss function may include respective contributions for respective pairs of consecutive jobs. The figure shows a contribution s11, 657, for the first two jobs of the first training instance, for example. Likewise, there may be a contribution for the second and third job of the first training instance, and for consecutive jobs of the other training instance. A contribution s11 may penalize pairs of earlier and later jobs in which the priority function assigns a higher priority to the earlier job than to the later job. A loss function based on such pairwise losses is relatively simple, for example, it may not use comparison of priorities of non-consecutive jobs. Still, it represents optimality since it encourages that all jobs to be ordered correctly.

Mathematically, the loss function can for example be phrased as the following empirical risk minimization problem (ERMP):

$$\min_{\varphi \in \mathcal{F}} \sum_{D \in E} \sum_{j=1}^{n(D)-1} \max\{0, \varphi(\tau_D(D_j)) - \varphi(\tau_D(D_{j+1})) + 1\}^2$$

where $\mathcal{F}$ is the set of linear combinations of comparisons of references $\varphi(\tau_D(D_j))$ to training jobs $D_j$; mathematically: the set of linear functions over the reproducing kernel Hilbert space of the kernel function K. (Instead of "+1" in the above ERMP, any positive value +ϵ may be used.) If the optimal value of this ERMP is zero and φ is an optimal solution, then the rule φ leads to the target schedule for each instance in the training set E. In this case φ is a solution to the linear system $$\forall D \in E: \varphi(\tau_D(D_j)) < \varphi(\tau_D(D_{j+1})), j=1, \ldots, n(D)-1.$$

If the optimal value of the ERMP is nonzero, then there are instances in the training set E that are are not ordered the priority function according to the target schedule. As a consequence, when scheduling is performed based on φ, it is not guaranteed to induce the target schedule. However, also in such cases, an optimal or near-optimal solution φ to the optimization of the loss function may not violate too many inequalities defining job orders related to such instances, and so the objective values of solutions induced by φ can be close to the objective values of the target solutions, thus resulting in a high-quality schedule.

Various techniques may be used to optimize the loss function described above. Generally, in a training signal determining operation Sig, 650, a training signal γ11, 660, may be determined, based on which the trainable parameters of the optimization, comprising the coefficients $\lambda_{ij}$ for the respective reference jobs, may be updated in an updating operation Upd, 670. For example, gradient descent, stochastic gradient, or other conventional optimization techniques can be applied.

Interestingly, however, the inventors realized that for the specific optimization to be performed, namely the determining of coefficients λij of elements of a reproducing kernel Hilbert space, it is also possible to perform the optimization more efficiently. Namely, the optimization can be regarded as a convex optimization problem in the reproducing kernel Hilbert space. This optimization problem can be tackled by using a local optimization approach. In this approach, an earlier job and a later job, e.g., jobs J11 and J12, may be selected from the pairs of jobs such that they provide a contribution to the loss function. For example, the priority function assigns a higher priority to the later job J12 than to the earlier job J11, or in any case the difference in priority between J11 and J12 is not sufficiently high. The earlier job and later job may be selected such that they provide the largest absolute or relative contribution to the loss function, for example. Thus, the training signal γ11 determined in operation Sig may indicate a pair of jobs contributing to the loss function.

The updating Upd may then update the priority function to reduce the contribution of this pair to the loss function. In particular, the coefficients λ11, λ12 for the pair of jobs may be adapted to reduce the contribution. With respect to the ERMP formulated mathematically above, the updating may be implemented as a projection onto a convex set in the space comprising the priority function as an element of the reproducing kernel Hilbert space, and respective loss contributions of respective pairs of jobs. The updating may completely eliminate the contribution of the pair to the loss, but this is not needed. The pair may still provide a nonzero contribution to the loss in the eventual optimization result.

Mathematically, an optimization to determine the priority function by a series of projections onto convex sets may be implemented as follows:

---

Algorithm for finding priority rules as linear combinations of comparisons

Input: A training set E comprising one or more training instances
A mapping τ of jobs to kernel function inputs
Output: A priority function $\varphi^* \in \mathcal{F}$.
1. Initialize φ by any available method (e.g., with a constant function). Define:
$$\forall D \in E, j = 1, \ldots, n(D) - 1: s_{D,j} := \min\{-1, \varphi(\tau_D(D_j)) - \varphi((\tau_D(D_{j+1}))\}.$$
2. While a stopping condition is not satisfied (e.g., the number of iterations does not exceed a given limit and/or the empirical risk related to the current priority function φ is not zero):
- $\forall D \in E, j = 1, \ldots, n(D) - 1$, denote $$\gamma_{D,j} := \frac{\varphi(\tau_D(D_j)) - \varphi(\tau_D(D_{j+1})) - s_{D,j}}{\|\kappa(\tau_D(D_j)) - \kappa(\tau_D(D_{j+1}))\|^2_{RKHS} + 1},$$

$$\begin{pmatrix} h(\tilde{\varphi}_{D,j}) \\ \tilde{s}_{D,j} \end{pmatrix} := \begin{pmatrix} h(\varphi) \\ s_{D,j} \end{pmatrix} - \gamma_{D,j} \begin{pmatrix} \kappa(\tau_D(D_j)) - \kappa(\tau_D(D_{j+1})) \\ -1 \end{pmatrix}.$$

-continued

Algorithm for finding priority rules as linear combinations of comparisons

- Derive training signal $\gamma l1$ by finding
  $(\tilde{D}, \tilde{j}) \in \text{argmax}\{\gamma_{D,j}: (D, j) \text{ with } \varphi(\tau_D(D_j)) - \varphi((\tau_D(D_{j+1})) > -1\}$.
- Update priority function $\varphi$ and loss contributions $s_{\tilde{D},\tilde{j}}$, Upd:

$$\begin{pmatrix} h(\varphi) \\ s_{\tilde{D},\tilde{j}} \end{pmatrix} := \begin{pmatrix} h(\tilde{\varphi}_{\tilde{D},\tilde{j}}) \\ \min\{-1, \tilde{s}_{\tilde{D},\tilde{j}}\} \end{pmatrix}.$$

3. Let $\varphi^*$ be a $\varphi$ which has the least empirical risk among those found in the previous steps. Return $\varphi^*$.

In this example, instead of −1, generally, any value $\epsilon < 0$ can be used.

Interestingly, performing the optimization in terms of projections onto convex sets may be efficient to implement, and may converge to an optimal solution of the ERMP if the optimal value is zero. Otherwise, the returned solution serves provides a good approximate solution of the ERMP.

For example, as also discussed elsewhere, the representation $$\xi(x,D)=(\log x_1, \ldots, \log x_m)$$

with $\gamma$: =0 may be used to find a posynomial rule over the space of job attributes. In this case, a priority rule found according to the above algorithm may be denoted as $\Sigma_{i=1}^m \alpha_i \log x_i$, corresponding to the rule defined by the posynomial $\Pi_{i=1}^m x^{\alpha_i}$. In this particular case, the optimal value of the ERMP is zero if there exists a posynomial rule yielding a target solution to each training instance. Interestingly, in this case, the above techniques are able to determine this optimal value.

Figure 7A:
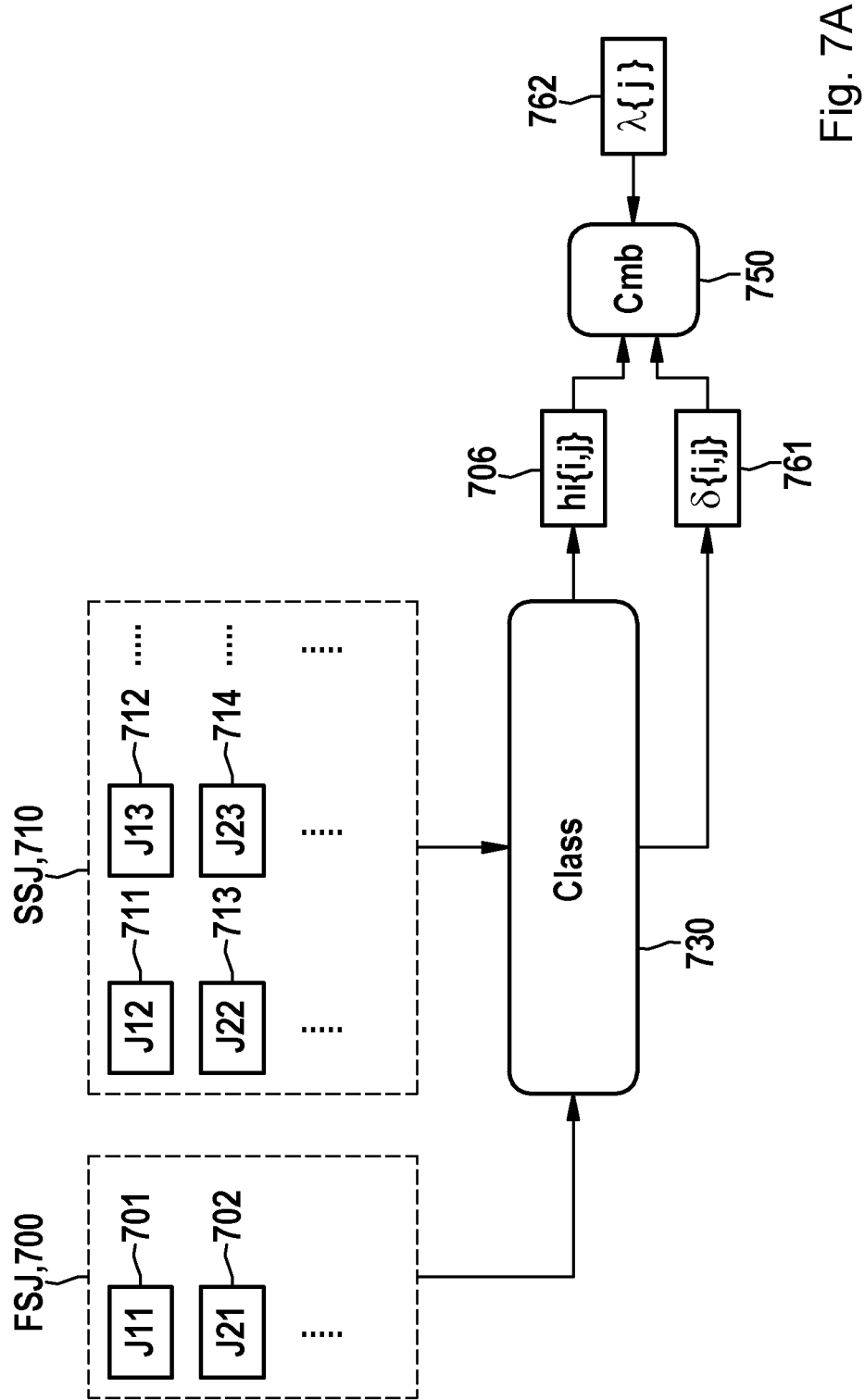
FIG. 7A shows a detailed example of determining a priority function, in accordance with an example embodiment of the present invention.

FIG. 7A shows a detailed, yet non-limiting, example of determining a priority function. For example, such a priority function may be evaluated as described with respect to FIG. 5B.

Shown in the example are one or more training instances each comprising multiple jobs ordered according to a target schedule. For illustrative purposes, shown is a training instance comprising jobs J11, 701; J12,711; and J13, 712. A further training instance is also shown, comprising jobs J21, 702; J22,713; and J23, 714. The respective training instances need not all have the same number of jobs.

Interestingly, in this figure, the priority function is based on respective position priority functions. A position priority function may be a function configured to separate jobs occurring at a given position in respective training instances from jobs not at this position, or at least from jobs occurring after the given position in the respective training instances. For example, shown in the figure is a first set of jobs FSJ, 700, occurring at the first position in respective training instances, and a second set of jobs SSJ, 710 occurring at other positions in the respective training instances. The position priority function may generally assign a value from a given domain to (most) jobs FSJ occurring at the respective position, and assign a value outside that domain to (most) other jobs SSJ. Such separation makes it possible to combine the respective position priority functions to obtain an overall priority function.

As shown in the figure, the position priority function may generally be obtained by performing a classifier training Class, 730, using the first set of jobs FSJ as a set of positive examples and the second set of jobs SSJ as a set of negative examples. Various conventional kernel-based classifiers may be used. The exact set of trainable parameters of the classifier training Class depends on how the position priority function is composed from invocations of the kernel function.

As is also discussed with respect to FIG. 5B, one possibility is to use a classifier that is defined in terms of a system of respective inequalities. An inequality may compare a priority value, determined by computing respective comparisons to respective reference jobs according to a set of parameters hi$\{i,j\}$, 706, to a constant $\delta\{i,j\}$, 761. For example, the classifier may classify a job to lie in the first set of jobs FSJ if all inequalities are met. The priority value can be computed as a single comparison to a reference job (e.g., any job 701-714), or as a linear combination of multiple comparisons to respective reference jobs (e.g., any jobs 701-714), for example. The value of the position priority function may be determined based on the differences to decision boundaries of the respective inequalities, for example, as a minimal decision boundary difference. Such a minimal decision boundary difference may generally assign positive values to jobs from the set FSJ and negative values to jobs not from the set, or the other way round, and thus separate jobs at the given position from other jobs.

An advantageous way of determining set of parameters hi$\{i,j\}$, $\delta\{i,j\}$, is by determining a binary classifier to distinguish the sets FSJ, SSJ as described with respect to FIG. 7B-7D. In particular, the techniques of FIG. 7B-7D refer to a mapping from an instance space D to a Hilbert space H. This mapping may be given by a kernel function as described herein. The kernel function may be selected such that $K(x,x)$ is constant, e.g., by defining $K_0$ acting on the set of attributes appropriately, e.g., as a radial basis function kernel. When selected in this way, a sphere mapping as described w.r.t. FIG. 7B-7D.

Applying the techniques of FIG. 7B-7D has the advantage that a position priority function can be obtained that perfectly separates the first set of jobs FSJ and the second set of jobs SSJ. This allows to determine a position priority function that perfectly reproduces the target schedule, and that is thus expected to work for scheduling particularly well. However, other ways of determining the set of parameters are possible as well, e.g., generic optimization techniques or conventional techniques for training kernel-based SVM classifiers can be used.

Mathematically, the use of an inequality-based classifier may be described as follows. Let $$C_j = \{\tau_D(D_j) : D \in E, n(D) \geq j\}, j = 1, \ldots, \max_{D \in E} n(D).$$

A position priority function may be denoted as:

$$\varphi_j(x) = \min_{i=1,\ldots,q_j} \delta_i^j - \langle h_i^j, \kappa(x)\rangle_{RKHS}$$

for each $C_j$ such that $\varphi_j$ is negative over $C_j$ and positive over all $C_i$ with $i \neq j$. For example, $\phi_j$ can be a polyhedral function as discussed with respect to FIG. 7B-7D. The method discussed with respect to those figures can receive $C_j$ as the set of positive examples and the union $\cup_{i \neq j} C_i$ as the set of negative examples, and K as the kernel function. The output can be interpreted as the above function $\varphi_j$.

Respective position priority functions for respective positions may be combined into an overall priority function. Parameters $\lambda\{j\}$, 762, for making this combination, may be determined in a combining operation Cmb, 750. The parameters can be weighting factors $\lambda_j$ as discussed with respect to FIG. 5B, e.g., the priority function may be defined as $$\varphi(x) = \min\left\{\lambda_j \varphi_j(x) : j = 1, \ldots, \max_{D \in E} n(D)\right\},$$

although other ways of combining the position priority functions are also possible. Generally, the position priority functions separate jobs at a given position from other jobs by assigning them a different subset of values, and the position priority function may use this separation to generally assign higher (or lower) priorities to jobs at earlier positions.

For example, weighting factors $\lambda_j$ may be determined as follows. Weighting factor $\lambda_1$ for the first position may be selected as an arbitrary positive coefficient. The other coefficients may be defined recursively as $$\lambda_{j+1} = \frac{\lambda_j \cdot \min\{|\varphi_j(x)| : x \in C_j\}}{(1+\alpha) \cdot \max\{|\varphi_{j+1}(x)| : x \in C_{j+1}\}},$$

where $\alpha > 0$ is a positive constant. Interestingly, it may be observed that if all jobs have different representations; if the position priority functions perfectly separate the jobs at the given position from other jobs; and if the above weighting factors are used, then a solution for the ERMP is found with a zero value of the objective function. That is, the solution is optimal and the priority function reproduces the target schedule for each training instance. This may be observed from the fact that, for any $x_j \in C_j$ and $x_{j+1} \in C_{j+1}$ we have $$\lambda_j |\varphi_j(x_j)| \geq \lambda_j \min\{|\varphi_j(x)| : x \in C_j\} = (1+\alpha)\lambda_{j+1}\max\{|\varphi_{j+1}(x)| : x \in C_{j+1}\} > \lambda_{j+1}|\varphi_{j+1}(x_{j+1})|,$$

from where it follows that $$\varphi(x_j) = \lambda_j \varphi_j(x_j) < \lambda_{j+1} \varphi_{j+1}(x_{j+1}) = \varphi(x_{j+1})$$

because $\varphi_j(x_j) < 0$ and $\varphi_{j+1}(x_{j+1}) < 0$. Since for any instance D the $\tau_D(D_i)$ is contained in $C_i$ for $i=1, \ldots, n(D)$, this means that $\varphi$ induces the sequence $1, \ldots, n(D)$ for every $D \in E$ because the above inequalities imply that $$\forall D \in E: \varphi(D_j) < \varphi(D_{j+1}), j=1, \ldots, n(D)-1.$$

Zero empirical risk may be achieved by multiplying $\varphi$ by a sufficiently large positive constant.

FIG. 7B-7D shows a detailed, yet non-limiting, example of determining a binary classifier based on a kernel function.

These figures relate to a computer-implemented method for training a binary classifier, wherein the classifier comprises a number of m of hyperplanes 720 in a Hilbert space. H. The method may comprise providing at least one training dataset of at least one pair of a numerical vector $e \in E \subset D$ in an instance space D and an associated label. The label may take one of two different label values L0, L1, respectively. Further, the method may comprise mapping the one or more numerical vectors e of the training data set to points of a unit sphere $S \subset H$ in the Hilbert space H according to a predetermined mapping $\tau^\circ \kappa: D \rightarrow H$, where the unit sphere S is defined according to a norm $\|.\|_H$ (Hilbert norm), which is derived from an inner product $\langle .,.\rangle_H$ of the Hilbert space H. Note that the symbols $\tau$ and $\kappa$ are used with a different meaning in the description of FIGS. 7b-7d than in the remainder of the specification.

Further, the method may comprise training the classifier based on the numerical vectors e of the training data set. The training may comprise determining the number m of hyperplanes 720, and determining the hyperplanes 720. Further, the training may be directed to determining that numerical vectors $e \in E^- \subset E$ of the training data mapped to the unit sphere S with a zero-label value L0 each lie on a side (e.g., an orientation side 730) of at least one of the hyperplanes 720.

As described herein, the proposed computer-implemented method can be trained offline. In offline training (i.e., a training set is completely available at the beginning of training and is then used for training), 100% accuracy with respect to the training data set (in-sample accuracy) can be achieved (but this does not mean that this accuracy has to be achieved in all cases). The accuracy of the binary classifier can be improved outside the training data set (out-of-sample accuracy).

FIG. 7B shows a schematic, low-dimensional representation of a hyperplane 720 in a Hilbert space H together with its orientation side 730.

FIG. 7C shows a schematic, low-dimensional representation of a polyhedron in a Hilbert space H and numerical vectors e, $x \in D$ mapped to a sphere $S \subset H$ in the Hilbert space H with (0, 1) or without a known label value (?).

FIG. 7D shows a schematic low-dimensional representation of the spaces D, RKHS, H, S and the mappings $\kappa: D \rightarrow RKHS$, $\tau: RKHS \rightarrow S \subset H$, and numerical vectors e, $x \in D$ with (0, 1) or without a known label value (?) in these spaces or under these mappings.

The proposed computer-implemented method of FIG. 7B-7D aims at training the binary classifier, where the classifier contains a number of m of hyperplanes 720 in a Hilbert space H (wherein the hyperplanes 720 each have an orientation side 730). The method may comprise providing at least one training dataset of at least one pair of a numerical vector $e \in E \subset D$ in an instance space D and an associated label, each label taking one of two different label values L0, L1 (e.g., L0=0 and L1=1). Often, and especially in offline training, the training dataset may comprise a plurality (e.g., >1e2, >1e3, >1e4, >1e5, >1e6, >1e7, >1e8) of pairs. The method may further comprise mapping the numerical vectors e of the training data set to points of a unit sphere $S \subset H$ in the Hilbert space H according to a predetermined mapping $\tau^\circ \kappa: D \rightarrow H$ where the unit sphere S is defined according to a norm $\|.\|_H$ (Hilbert norm), which is derived from an inner product $\langle .,.\rangle_H$ associated with the Hilbert space H. The Hilbert space H can preferably be chosen as a real Hilbert space, where the inner product is $\langle .,.\rangle_H$ is symmetric and in particular linear in both entries. The given mapping $\tau^\circ \kappa: D \rightarrow H$ can be chosen (e.g. injective) such that no two differently classified vectors of the training data set can be mapped to one and the same point of the unit sphere S can be mapped. The method can be extended in that the unit sphere S can be replaced by any sphere with a radius not equal to one and not equal to zero, provided that this sphere is also defined by the inner product $\langle .,. \rangle_H$. Further, the method may comprise training the classifier based on the numerical vectors e of the training data set. The training may comprise determining the number of hyperplanes m of hyperplanes 720, and determining the hyperplanes 720 (and their respective orientation sides 730). Further, the training may be directed to determining that numerical vectors $e \in E^- \subset E$ of the training data set mapped on the unit sphere S with the zeroth label value L0 each lie on an orientation side 730 of at least one of the hyperplanes 720 (of this classification system). All numerical vectors $e \in E^- \subset E$ mapped to the unit sphere S of the training data set with the zeroth label value L0 may each lie on at least one side (orientation side 730) of a respective hyperplane 720.

Per hyperplane 720, the side may be an orientation side 730, and training may further comprise determining the orientation sides 730 per hyperplane 720. The hyperplanes 720 may each be defined by a hyperplane orientation function $g_i(z) = \langle h_i, z \rangle_H$, $i=1, \ldots, m$ depending on a (generic, i.e., arbitrary) point $z \in H$ of the Hilbert space H, provided that they are each equal to a respective threshold value $\delta_i$, $i=1, \ldots, m$ where the hyperplane orientation function $g_i(z)$ which depends on a point $z \in H$ of the Hilbert space H in each case is the inner product $\langle .,. \rangle_H$ associated with the Hilbert space H of a linear combination $h_i = \Sigma_{e \in E} \lambda_{i,e} \tau^\circ \kappa(e)$, $i=1, \ldots, m$ parameterized by respective coefficients $\lambda_{i,e}$, $i=1, \ldots, m$, $e \in E$ of numerical vectors e all mapped to the unit sphere S of the training data set and the point $z \in H$ is of the Hilbert space H. Furthermore, for each hyperplane 720, the orientation side 730 may be defined as an open half-space 740 to a side of the hyperplane 720 of the Hilbert space H whereby the side is defined in each case in the direction of a gradient of the hyperplane orientation function $g_i(z) = \langle h_i, z \rangle_H$, $i=1, \ldots, m$ dependent on a point $z \in H$ of the Hilbert space H. Each half-space 740 is open in that it does not include the respective hyperplane 720. When in a finite-dimensional real Hilbert space, the inner product $\langle .,. \rangle_H = \langle .,A. \rangle$ can be expressed by a Euclidean inner product $\langle .,. \rangle$ and a linear mapping $A: H \to H$, then a gradient 750 can be calculated via $A^T h_i$. Furthermore, for each hyperplane 720 a hyperplane inequality $g_i(z) \leq \delta_i$ for a (generic) point $z \in H$ of the Hilbert space H can be defined which is violated if (or exactly if) the (generic) point $z \in H$ lies on the orientation side 730 of the hyperplane 720.

Such a hyperplane inequality (in the edge case the hyperplane inequality can be an equation) is $g_i(z) \leq \delta_i$ for $i=1, \ldots, m$. Thus, the orientation side 730 per hyperplane 720 can also be defined as the set of all points $z \in H$ with $g_i(z) > \delta_i$. Furthermore, per hyperplane 720 an inequality (in the edge case the inequality can be an equation) $f_i(x) = g_i(\tau^\circ \kappa(x)) \leq \delta_i$ for a (generic) numerical vector $e \subset D$ of the instance space D can be defined which is violated if (or exactly if) the vector mapped to the unit sphere $S \subset H$ of the Hilbert space H by the given mapping $\tau^\circ \kappa: D \to H$ violates the respective hyperplane inequality. The advantage is that these inequalities can form a classification system. The determination of the hyperplanes 720 and their respective orientation sides 730 (during the training) can be the determination of the coefficients $\lambda_{i,e}$ per hyperplane 720 and the threshold values $\delta_i$ per hyperplane 720. As an example, FIG. 1B shows a low-dimensional hyperplane 720 in a Hilbert space H together with its orientation side 730 and a gradient 750. The dimensions of spaces shown in FIG. 1A-1C. D, H, S or of hyperplanes, respectively, do not represent a restriction.

In offline training, the training may further be directed to ensure that none of the numerical vectors $e \in E^+ \subset E$ of the training data set mapped to the unit sphere S having a first label value L1 lies on an orientation side 730 of the hyperplanes 720. This may prove advantageous in that it may result in a classification rule and thus a classifier, where the classifier may have 100% accuracy on the training data set (in-sample accuracy) after offline training. Since the orientation side 730 is defined as an open half-space 740, the numerical vectors $e \in E^+ \subset E$ of the training data set mapped to the unit sphere S with a first label value L1 may also lie on a hyperplane 720.

In the offline training, the training may further be directed to ensure that none of the numerical vectors $e \in E^+ \subset E$ of the training data set mapped to the unit sphere S with the first label value L1 lie outside of a polyhedron and that all numerical vectors $e \in E^- \subset E$ of the training data set mapped onto the unit sphere S with the zeroth label value L0 lie outside of the polyhedron, wherein the polyhedron in the Hilbert space H may be defined by the hyperplanes 720. The polyhedron may be defined, for example, by a (finite) intersection of all non-orientation sides of the hyperplanes 720, where a non-orientation side of a hyperplane 720 is defined as the complement in Hilbert space H to the orientation side 730 of the hyperplane 720 and thus may represent a closed half-space. Particularly illustrative is the case in which the polyhedron may be bounded and/or oriented. Such a polyhedron is exemplarily shown in FIG. 7C. Also shown are numerical vectors $e, x \in D$ mapped on the sphere S with (0, 1) or without known label value to be classified (?). In particular, the polyhedron need not be regular.

After offline training, for a numerical vector to be classified $x \in D$ the first label value L1 may be assigned if all inequalities evaluated on the numerical vector to be classified x are fulfilled, and the zeroth label value L0 may assigned if at least one of the inequalities evaluated on the numerical vector x to be classified is violated. Such an assignment may constitute a classification rule. A numerical vector to be classified $x \in D$ may in particular be taken from a pair of the training data set. Thus, after offline training, the accuracy on the training data set (in-sample accuracy) can be evaluated. Each inequality $f_i(x) \leq \delta_i$, $i=1, \ldots, m$ implies that an instance function $f_i(x)$ depending on one of the elements $x \in D$ of the instance space D, in particular the element to be classified $x \in D$, is less than or equal to the respective threshold value $\delta_i$, $i=1, \ldots, m$ where, for each hyperplane 720, the instance function $f_i: D \to \mathbb{R}, x \mapsto f_i(x)$ is defined depending on an element $x \in D$ in the instance space D, in particular on an element to be classified $(x \in D)$, as a concatenation of the given mapping $\tau^\circ \kappa: D \to H$ and hyperplane orientation function $g_i: H \to \mathbb{R}$, $g_i(z) = \langle h_i, z \rangle_H$, $i=1, \ldots, m$ depending on the respective point $z \in H$ of the Hilbert space H, where the element $x \in D$ in the instance space D, in particular the element to be classified $x \in D$ is mapped by the given mapping $\tau^\circ \kappa: D \to H$ to the point $z = \tau^\circ \kappa(x) \in H$ of the Hilbert space H.

Such a classifier has a classification system defined by the m hyperplanes 720 in the Hilbert space H and their respective orientation sides 730—or equivalently by the m inequalities—as well as the described classification rule, as described herein.

Mapping the numerical vectors e of the training data set may involve choosing a kernel function $K: D \times D \to \mathbb{R}$, that maps two elements $x, y \in D$ of the instance space D into the real numbers and which defines a reproducing kernel Hilbert space RKHS for the kernel function K and a feature map $\kappa: D \to$ RKHS from the instance space D into the reproducing kernel Hilbert space RKHS, wherein an inner product associated with the reproducing kernel Hilbert space RKHS is $\langle .,. \rangle_{RKHS}$ after retraction to the instance space D corresponds to the kernel function $K(x,y)=\langle \kappa(x), \kappa(y) \rangle_{RKHS}$, $\forall x, y \in D$. The given mapping $\tau^{\circ}\kappa$: D→H from the instance space D into the Hilbert space H can then be a concatenation of the feature mapping $\kappa$: D→RKHS and a sphere mapping $\tau$: RKHS→S⊂H from the reproducing kernel Hilbert space RKHS into the unit sphere S of the Hilbert space H. FIG. 7D shows a schematic, non-restrictive low-dimensional representation of the spaces D, RKHS, H, S and the mappings $\kappa$: D→RKHS, $\tau$:RKHS→S⊂H. In addition, numerical vectors e, x∈D with (0, 1) or without (?) known label value are shown. The unknown label value (?) can be determined by applying of the classifier.

The sphere map $\tau$:RKHS→S⊂H can transform an element h of the reproducing kernel Hilbert space RKHS into the Hilbert space H and normalize it to norm one $\|\tau(h)\|_H = 1$, in particular where the sphere mapping extends the element h of the reproducing kernel Hilbert space RKHS with a coordinate with the value one (h,1) and the unit sphere S is centered in an origin of the Hilbert space H. In general, the reproducing kernel Hilbert space RKHS and the Hilbert space H can be infinite-dimensional Hilbert spaces. Otherwise, if they are finite-dimensional, the dimension of the Hilbert space H can be greater by one than the dimension of the reproducing kernel Hilbert space RKHS.

Next, the method steps of offline training are described. The determination of the number m of hyperplanes 720 as well as the determination of the coefficients $\lambda_{i,e}$ and the threshold values $\delta_i$ of the hyperplanes 720 may comprise at least three steps: In a first step, a temporary set $E_0$ can be defined, which is composed of all numerical vectors $e \in E^- \subset D$ of the training data set having the zeroth label value L0, i.e. $E_0 := E^-$. A counter i for the hyperplanes 720 may be initialized to zero, i.e. i=0 (or with some other initial value for the counter).

In at least a second step, first an element $e_0 \in E_0$ of the temporary set $E_0$ can be selected. Furthermore, the coefficient $\lambda_{i,e_0}$ of the hyperplane given by the numerator i and the selected element $e_0$ can be set to one, e.g. $\lambda_{i,e_0} := 1$. Furthermore, all other coefficients denoted by the numerator i $\lambda_{i,e}$, $\forall e \in E_0 \cup E^+$, $e \neq e_0$ can be set to zero, e.g.:

$$\lambda_{i,e} := 0, \forall e \in E_0 \cup E^+, e \neq e_0$$

Furthermore, the threshold value designated by the counter i, $\delta_i$, can be defined as half the sum of the instance function $f_i(e_0)$ dependent on the selected element $e_0$ (e.g. on the instance function value $f_i(e_0)$ of the instance function value at the selected element $e_0$) and the maximum $\max\{f_i(e_1): e_1 \in E^+\}$ over the instance functions $f_i(e_1)$ dependent on the elements $e_1 \in E^+$ with the first label value L1 denoted by the numerator i, thus holds:

$$\delta_i = 0.5 \cdot (f_i(e_0) + \max\{f_i(e_1): e_1 \in E^+\})$$

In at least a third step, all elements in the temporary set $E_0$ that do not satisfy all of the inequalities numbered up to the numerator i can be removed. Furthermore, the numerator i may be incremented by one, i.e. i:=i+1 and then can be jumped back to the second step if the temporary set is $E_0$ is not empty, or the number m of hyperplanes 720 can be set equal to the counter i, m:=i, if the temporary set $E_0$ is empty.

This algorithm for offline training can be advantageous in that it can generate a classifier in a finite number of steps which, in contrast to conventional classifiers in the related art, can have (nearly) 100% accuracy on the training data set (in-sample accuracy). Another advantage of the generated classifier can be seen in the fact that the number of inequalities (of the classification system) of the classifier is not dependent on the (usually very large) number of training pairs. This can in particular simplify an application of the trained classifier.

To improve the practical behaviour of the algorithm and to reduce the number of inequalities, a so-called cut augmentation procedure can be used. For this purpose, immediately after the (or a) second step of the described procedure for offline training, a further first substep and a further second substep can be performed: In a further first sub-step of the second step, an auxiliary set of $$X_0 := \{x_0 \in E_0: f_i(x_0) > \delta_i\}$$

can be calculated as the set of elements $x_0 \in E_0$ in the temporary set $E_0$ whose instance functions $f_i(x_0)$ denoted by the counter i is greater than the threshold value $\delta_i$ indicated by the counter i. Furthermore, the cardinality of the auxiliary set $X_0$ can be determined. Furthermore, the coefficients $\lambda_{i,e}$ indicated by the counter i can be redetermined. For this an expression $F(h_i)$ can be maximized in an optimization, where the expression $F(h_i)$ can be defined as a quotient $$F(h_i) = \frac{\min_{x_0 \in X_0} f_i(x_0) - \max_{e_1 \in E^+} f_i(e_1)}{\|h_i\|_H}$$

of a difference as numerator of the quotient and the norm $\|h_i\|_H$ of the linear combination $h_i$ of all numerical vectors e mapped to the unit sphere S of the training data set as the denominator of the quotient, where the difference is a (mathematical: the) minimum $\min_{x_0 \in X_0} f_i(x_0)$ over the respective instance functions $f_i(x_0)$ depending on the elements $x_0$ of the auxiliary set $X_0$ and denoted by the numbers i minus a (mathematical: the) maximum $\max_{e_1 \in E^+} f_i(e_1)$ over the respective instance functions $f_i(e_1)$ depending on the numerical vectors $e_1 \in E^+ \subset D$ of the training data set, which have the first label value L1, and denoted by the numbers i, whereby the optimization need not necessarily be exact.

In a further second substep of the second step, again the auxiliary quantity $X_0$ can be computed as in the further first substep of the second step. Furthermore, the first sub-step of the second step may be repeated if the recomputed auxiliary set $X_0$ has a larger cardinality than the cardinality of the auxiliary set $X_0$ calculated in the first substep of the second step. Alternatively (i.e., if the recalculated auxiliary set $X_0$ does not have a cardinality greater than the cardinality of the auxiliary set $X_0$ calculated in the first substep of the second step) a new threshold value $\delta_i$ denoted by i can be computed as half the sum of the minimum over instance functions $f_i(x_0)$ defined by the elements $x_0$ of the auxiliary set $X_0$ and denoted by the numerator i and the maximum over the instance functions $f_i(e_1)$ which depend on the numerical vectors $e_1 \in E^+ \subset D$ of the training data set having the first label value L1 and denoted by the counter i, i.e.:

$$\delta_i := 0.5(\min\{f_i(x_0): x_0 \in X_0\} + \max\{f_i(e_1): e_1 \in E^+\})$$

Then, the third step of the described procedure for offline training can proceed.

In the optimization (maximum margin problem), in some examples a respective ε-approximate solution for the coefficients $\lambda_{i,e}$ denoted by the numerator i can be calculated, where an ε-approximate solution means that the expression evaluated at the ε-approximate solution $F(h_i)$ is greater than or equal to the expression evaluated at an optimal solution OPT $F(h_i)$ divided by the sum of one and a non-negative real number (ε), i.e.:

$$F(h_i) \geq \frac{1}{1+\varepsilon} OPT$$

In some examples, the optimization may be calculated using a two-sided von Neumann algorithm. This may comprise a first, second, third and fourth substep.

In a first substep, a first vector $e_0 \in X_0$ (the equality of the variable name with that of the variable chosen in the second step $e_0$ is unproblematic insofar as the optimization can have its own namespace) of the auxiliary set $X_0$ is chosen and mapped according to the given mapping $\tau°\kappa: D \to H$ to a first unit vector $z_0 := \tau°\kappa(e_0)$ into the unit sphere S of the Hilbert space H. Furthermore, a second vector $e_1 \in E^+$ from a set $E^+ \subset D$ of the numerical vectors $e_1 \in E^+ \subset D$ of the training data set having the first label value L1 can be selected and mapped according to the given mapping $\tau°\kappa LD \to H$ to a second unit vector $z_1 := \tau°\kappa(e_1)$ into the unit sphere S of the Hilbert space H. Furthermore, a difference quantity $h:=z_0-z_1$ can be formed as the first vector $z_0$ in the unit sphere S minus the second vector $z_1$ in the unit sphere S. Furthermore, a non-negative real number $\varepsilon$ can be chosen.

At least a second substep may comprise choosing a further first vector $e_0' \in X_0$ of the auxiliary set $X_0$ such that the inner product $\langle .,. \rangle_H$ of the Hilbert space H from the difference quantity h and the further first vector $e_0' \in X_0$ of the auxiliary set $X_0$ which is mapped according to the given mapping $\tau°\kappa: D \to H$ into the unit sphere S of the Hilbert space H is minimized by $e_0'$ over $X_0$, i.e.:

$$\langle h, \tau°\kappa(e_0') \rangle_H = \min_{e \in X_0} \langle h, \tau°\kappa(e) \rangle_H$$

Furthermore, another second vector $e_1' \in E^+$ of the set $E^+ \subset D$ of the numerical vectors $e_1 \in E^+ \subset D$ of the training data set having the first label value L1 may be chosen such that the inner product $\langle .,. \rangle_H$ of the Hilbert space H from the difference quantity h and the further second vector $e_1' \in E^+$ which is mapped according to the given mapping $\tau°\kappa K: D \to H$ into the unit sphere S of the Hilbert space H is maximized by $e_1'$ over $X_1$, i.e.:

$$\langle h, \tau°\kappa(e_1') \rangle_H = \max_{e \in X_1} \langle h, \tau°\kappa(e) \rangle_H$$

In at least a third substep, a convex quadratic problem with a first real variable $\alpha_0 \in [0,1]$ in the unit interval and with a second real variable $\alpha_1 \in [0,1]$ in the unit interval can be solved. For this purpose a first auxiliary variable $z_0'$ in Hilbert space H can be defined as a first sum $$z_0' = (1-\alpha_0) \cdot z_0 + \alpha_0 \cdot \tau°\kappa(e_0')$$

of two terms, where the first term is the first unit vector $z_0$ multiplied by a difference of one minus the first real variable $\alpha_0$ and the second term is the further first vector $e_0'$ mapped according to the given mapping $\tau°\kappa: D \to H$ into the unit sphere S of the Hilbert space H multiplied by the first real variable $\alpha_0$. Furthermore, a second auxiliary variable $z_1'$ in the Hilbert space H can be defined as a second sum $$z_1' = (1-\alpha_1) \cdot z_1 + \alpha_1 \cdot \tau°\kappa(e_1')$$

of two further terms, where the further first term is the second unit vector $z_1$ multiplied by a further difference of one minus the second real variable $\alpha_1$ and the second term is the further second vector $e_1'$ mapped according to the given mapping $\tau°\kappa: D \to H$ into the unit sphere S of the Hilbert space H multiplied by the second real variable $\alpha_1$. Furthermore, the first real variable $\alpha_0$ and the second real variable $\alpha_1$ can be determined in such a way that the norm $\|.\|_H$ of a difference of the first auxiliary variable $z_0'$ and the second auxiliary variable $z_1'$, i.e. $\|z_0'-z_1'\|_H$ is minimized.

In at least a fourth substep, the first unit vector $z_0$ can be replaced by the first auxiliary quantity $z_0'$ and the second unit vector $z_1$ can be replaced by the second auxiliary quantity $z_1'$ where the first auxiliary variable $z_0'$ can be computed with the first real variable $\alpha_0$ determined in the third substep and the second auxiliary variable $z_1'$ can be computed with the second real variable $\alpha_1$ determined in the third substep. Furthermore, the difference variable h can be set to the first unit vector $z_0$ minus the second unit vector $z_1$, e.g.:

$$h := z_0 - z_1$$

Furthermore, it can be checked whether another expression is greater than or equal to the inverse of the sum of one and the non-negative real number $\varepsilon$ e.g.:

$$\frac{\min_{e \in X_0} \langle h, \tau°\kappa(e) \rangle_H - \max_{e \in X_1} \langle h, \tau°\kappa(e) \rangle_H}{\|h\|_H^2} \geq \frac{1}{1+\epsilon}$$

where the further expression can be defined as a further quotient of a further difference as the numerator of the quotient and the square of the norm $\|h\|_H$ of the difference quantity h as the denominator of the quotient, the further difference being a minimum $\min_{e_0 \in X_0} \langle h, \tau°\kappa(e) \rangle_H$ over the inner products $\langle .,. \rangle_H$ of the difference quantity h and in each case one of the elements $e_0$ of the auxiliary set $X_0$ mapped according to the given mapping $\tau°\kappa: D \to H$ into the unit sphere S of the Hilbert space H minus a maximum $\max_{e_1 \in E^+} \langle h, \tau°\kappa(e) \rangle_H$ over the inner products $\langle .,. \rangle_H$ from the difference quantity h and in each case one of the numerical vectors $e_1 \in E^+ \subset D$ of the training data set mapped according to the given mapping $\tau°\kappa: D \to H$ into the unit sphere S of the Hilbert space H having the first label value L1. Thereafter, it is possible to jump back to the second substep if the test is negative. Alternatively (e.g., if the test is positive), from the difference quantity h and the knowledge of the first real variable calculated per third substep $\alpha_0$ and second real variable $\alpha_1$ the coefficients $\lambda_{i,e}$ for each first substep of the second step can be calculated.

The images of the auxiliary sets $X_0$, $X_1$ under the given mapping $\tau°\kappa: D \to H$ may be linearly separable. This condition can always be guaranteed when called from the main algorithm.

A trained binary classifier may assign, as described, to each element $x \in D$ of the instance space D, in particular an element to be classified $x \in D$, one of the two different label values L0, L1. Thus, a computer-implemented method for using a binary classifier is provided, wherein the binary classifier has been trained as described.

Figure 8:
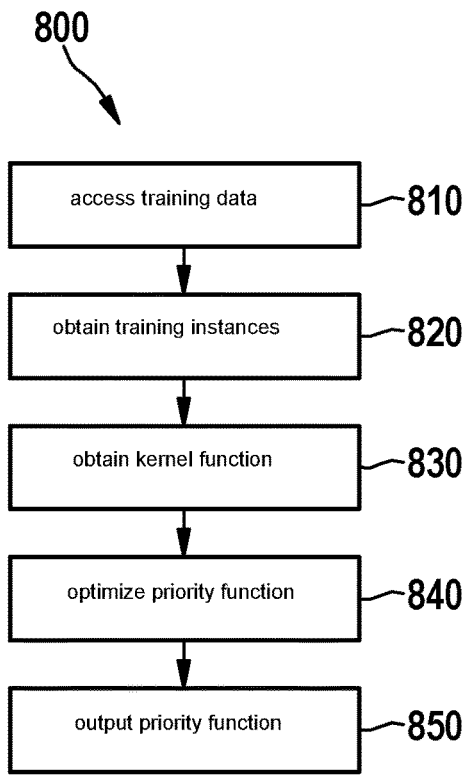
FIG. 8 shows a method of determining a priority function, in accordance with an example embodiment of the present invention.

FIG. 8 shows a block-diagram of computer-implemented method 800 of determining a priority function for scheduling jobs of a manufacturing or logistics process. The priority function may be defined to determine a priority value indicating a priority for a job of the manufacturing or logistics process. The method 800 may correspond to an operation of the system 100 of FIG. 1. However, this is not a limitation, in that the method 800 may also be performed using another system, apparatus or device.

The method 800 may comprise, in an operation titled "ACCESS TRAINING DATA", accessing 810 training data comprising a set of multiple training jobs. The method may further comprise, in an operation titled "OBTAIN TRAINING INSTANCES", obtaining 820 from the training data one or more training instances. A training instance may comprise multiple jobs of set of the training jobs ordered according to a target schedule. The multiple jobs may comprise an earlier job ordered before a later job.

The method 800 may comprise, in an operation titled "OBTAIN KERNEL FUNCTION", obtaining 830 a kernel function. The kernel function may be defined to compare representations of two respective jobs. A class of priority functions may be defined in terms of the kernel function. A priority function of the class of priority functions may include comparison according to the kernel function with one or more reference jobs.

The method 800 may comprise, in an operation titled "OPTIMIZE PRIORITY FUNCTION", determining 840 the priority function by performing an optimization. The optimization may be configured to select the priority function from the class of priority functions. The optimization 840 may be configured to penalize the priority function for assigning a higher priority to the later job than to the earlier job.

The method 800 may comprise, in an operation titled "OUTPUT PRIORITY FUNCTION", outputting 850 the determined priority function from the class of priority functions for use in the manufacturing or logistics process.

Figure 9:
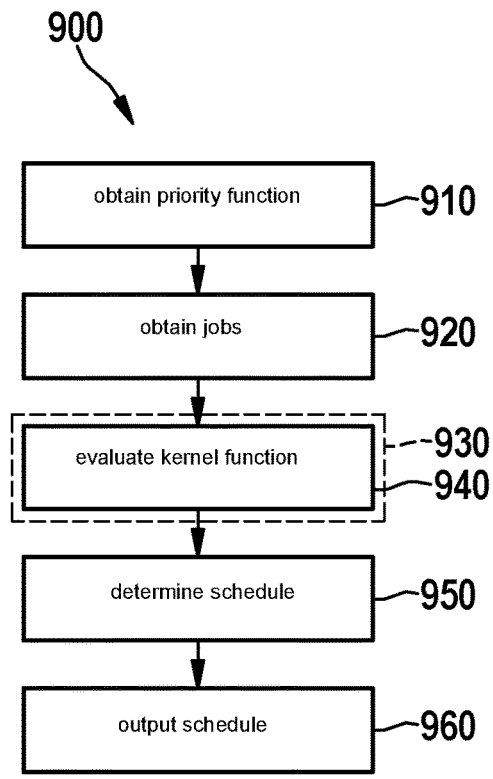
FIG. 9 shows a method of scheduling jobs, in accordance with an example embodiment of the present invention.

FIG. 9 shows a block-diagram of computer-implemented method 900 of scheduling jobs of a manufacturing or logistics process. The method 900 may correspond to an operation of the system 200 of FIG. 2 or FIG. 3. However, this is not a limitation, in that the method 900 may also be performed using another system, apparatus or device.

The method 900 may comprise, in an operation titled "OBTAIN PRIORITY FUNCTION", obtaining 910 data representing a priority function. The priority function may have been previously trained as described herein, e.g., according to method 800 of FIG. 8. The priority function may be defined to determine a priority value indicating a priority for a job of the manufacturing or logistics process. The priority function may be defined to invoke a kernel function. The kernel function may be defined to compare representations of two respective jobs. The priority function may include comparisons by the kernel function of the job with one or more reference jobs.

The method 900 may comprise, in an operation titled "OBTAIN JOBS", obtaining 920 job status data comprising representations of multiple jobs to be scheduled.

The method 900 may comprise, in an operation titled "EVALUATE PRIORITY FUNCTION", evaluating 930 the priority function on the multiple respective jobs to obtain multiple respective priority values. The evaluating 930 of the priority function on a selected job of the multiple respective jobs may comprise, in an operation titled "EVALUATE KERNEL FUNCTION", evaluating 940 the kernel function to compare the selected job to the one or more reference jobs.

The method 900 may comprise, in an operation titled "DETERMINE SCHEDULE", determining 950 a schedule for the multiple jobs based on the priority values.

The method 900 may comprise, in an operation titled "OUTPUT SCHEDULE", outputting 960 scheduling data representing the schedule to enable the multiple jobs to be carried out according to the schedule. In particular, the method may comprise carrying out the multiple jobs according to the schedule.

It will be appreciated that, in general, the operations of method 800 of FIG. 8 and method 900 of FIG. 9 may be performed in any suitable order, e.g., consecutively, simultaneously, or a combination thereof, subject to, where applicable, a particular order being necessitated, e.g., by input/output relations. Some or all of the methods may also be combined, e.g., method 900 of applying a trained model may be applied subsequently to this trained model being trained according to method 800.

Figure 10:
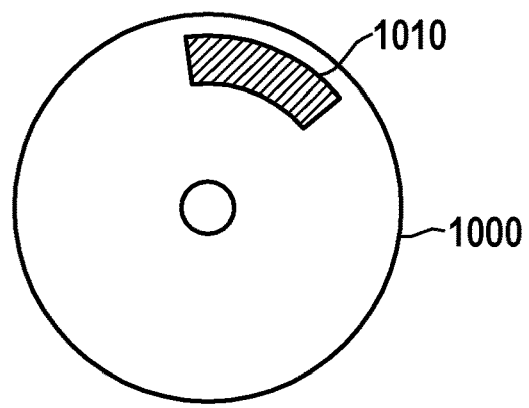
FIG. 10 shows a computer-readable medium comprising data, in accordance with an example embodiment of the present invention.

The method(s) may be implemented on a computer as a computer implemented method, as dedicated hardware, or as a combination of both. As also illustrated in FIG. 10, instructions for the computer, e.g., executable code, may be stored on a computer readable medium 1000, e.g., in the form of a series 1010 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 10 shows an optical disc 1000. Alternatively, the computer readable medium 1000 may comprise transitory or non-transitory data 1010 representing a priority function for use in scheduling jobs of a manufacturing or logistics process, for example, according to a method as described herein, e.g., method 900 of FIG. 9. For example, the priority function may have been determined according to a method as described herein, e.g., method 800 of FIG. 8. The priority function may be defined to determine a priority value indicating a priority for a job of the manufacturing or logistics process. The priority function may be defined to invoke a kernel function. The kernel function may be defined to compare representations of two respective jobs. The priority function may include comparison by the kernel function of the job with one or more reference jobs.

Figure 11A:
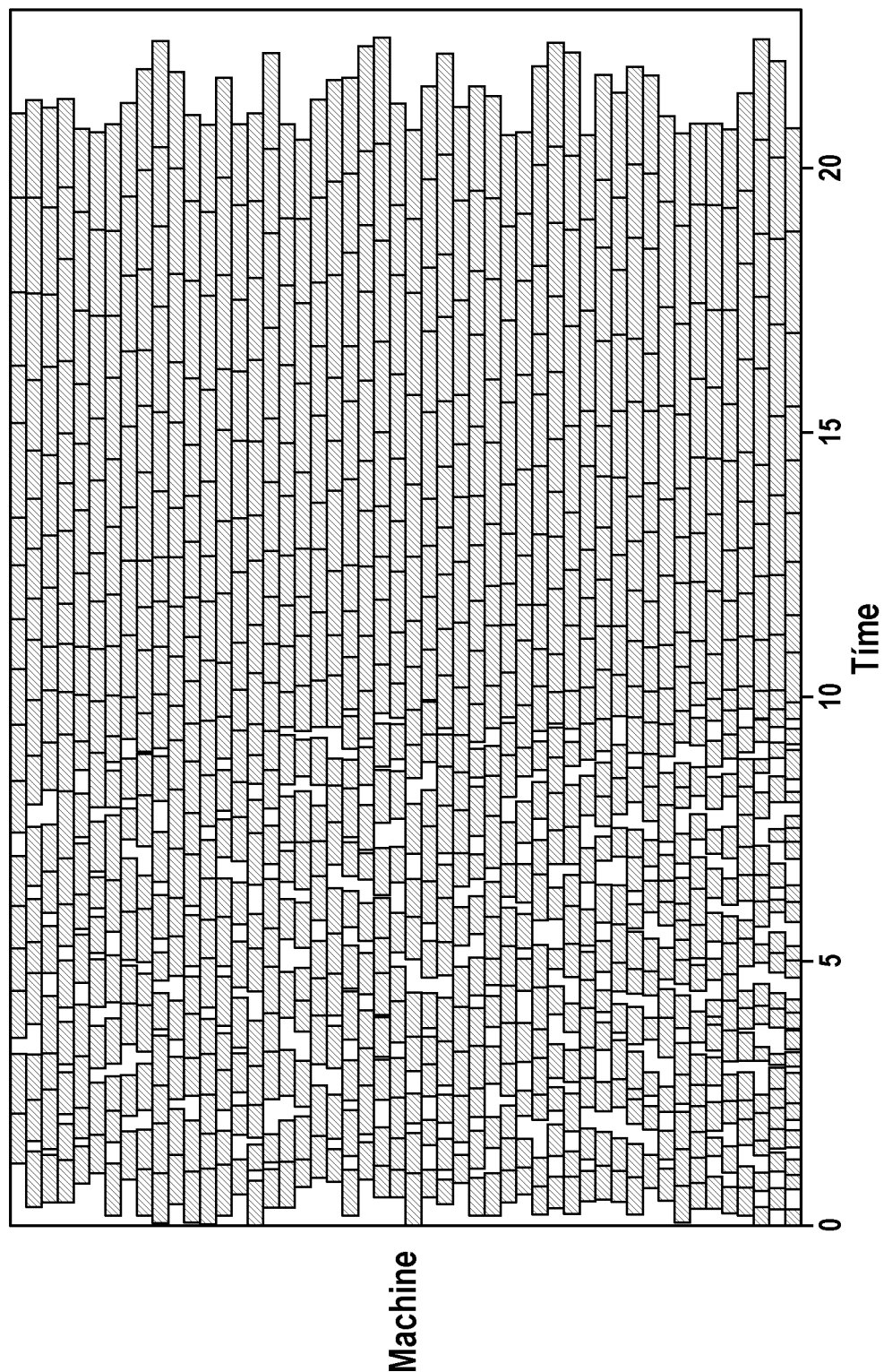
FIG. 11A shows a determined schedule.
Figure 11B:
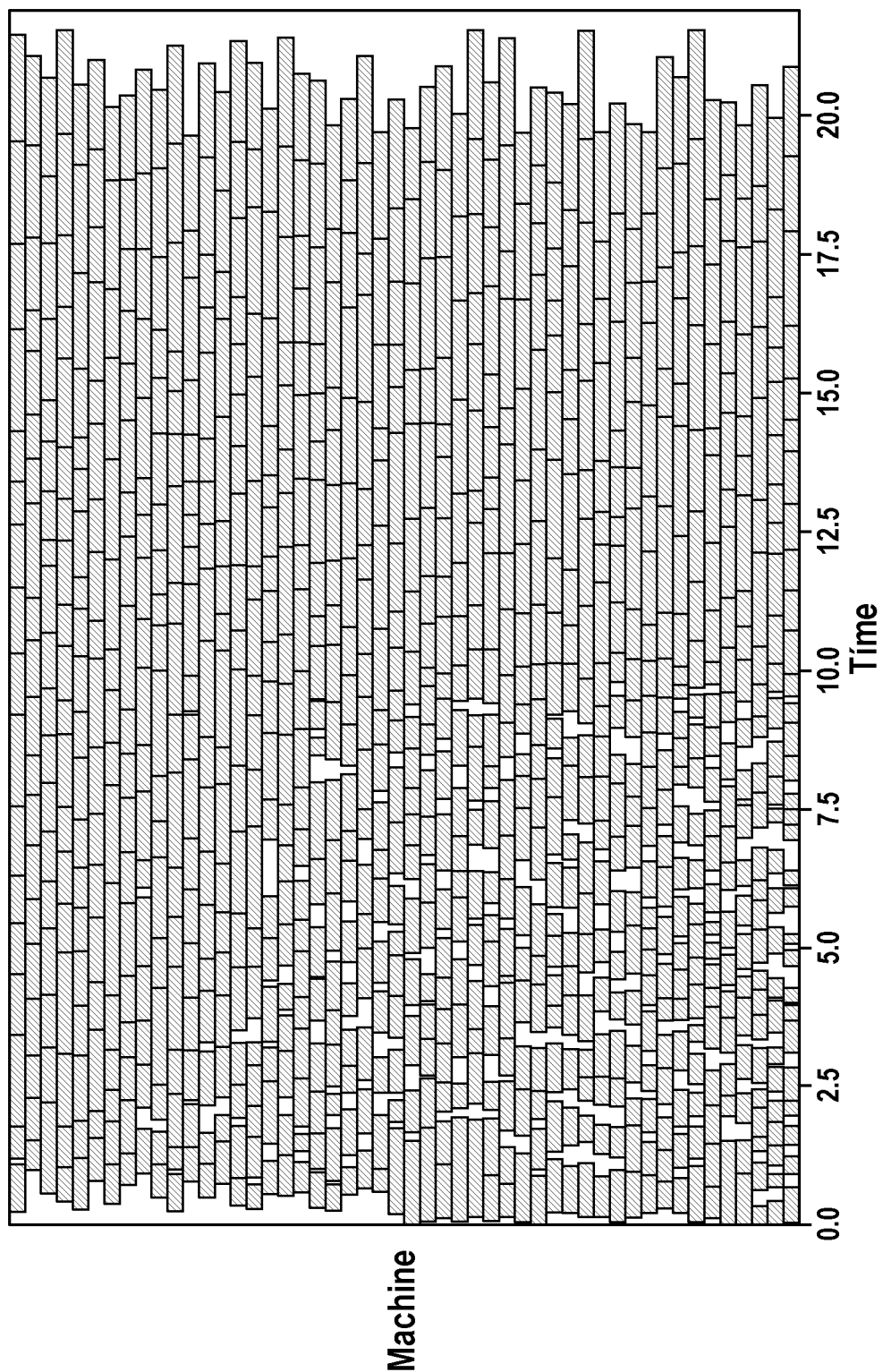
FIG. 11B shows a determined schedule, in accordance with an example embodiment of the present invention.

FIG. 11A and FIG. 11B compare jobs scheduled according to standard rules, to jobs scheduled according to a priority function as described herein.

This example shows an instance of a scheduling problem $Pk|r_j|\Sigma_j w_j C_j$ with 50 machines and 1000 jobs.

FIG. 11A shows the best schedule for this scheduling problem determined using standard rules. Namely, schedules were determined by applying the four standard rules described herein (earliest release data, shortest processing time, weighed shortest processing time, maximum weight) and applying a random search algorithm as described herein; and returning the best solution out of the determined schedules.

In FIG. 11B, a schedule is shown for this scheduling problem as determined using list scheduling using a priority function determined according to the techniques of FIG. 6B. Attribute values $\xi(x,D)=(x, y, \log x, \log y)$ as described herein were used, and $\gamma=0$ was used, e.g., the degree of similarity between job sets as described herein was not used. To determine the schedule, the number of jobs in training instances selected from the scheduling problem of 1000 jobs, was equal to 150. A target schedule was determined for the training instance as described with respect to FIG. 11A, so by applying the four standard rules and random search, and returning the best solution.

In FIG. 11B, using the determined priority function, an improvement of >2.4% was reached compared to the schedule of FIG. 11A. In the figures, gaps between the occupied slots in the Gantt charts are because of the presence of release dates. The schedule of FIG. 11B constructed by means of the set of rules generated as described herein is somewhat tighter than the schedule of FIG. 11A, showing that the provided techniques allow to obtain a better solution than known rules, even if only known rules are used to determine the target schedules for determining the priority function.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described separately does not indicate that a combination of these measures cannot be used to advantage.

What is claimed is:

1. A computer-implemented method of scheduling jobs of a manufacturing or logistics process or for data package transmission in telecommunications, the method comprising the following steps:
    obtaining data representing a priority function, wherein the priority function is defined to determine a priority value indicating a priority for a job of the manufacturing or logistics process, wherein the priority function is defined to invoke a kernel function, wherein the kernel function is defined to compare representations of two respective jobs, and wherein the priority function includes comparisons by the kernel function of the job with one or more reference jobs;
    obtaining job status data including representations of multiple jobs to be scheduled;
    evaluating the priority function on the multiple respective jobs to obtain multiple respective priority values, wherein the evaluating of the priority function on a selected job of the multiple respective jobs includes evaluating the kernel function to compare the selected job to the one or more reference jobs, wherein the evaluating of the kernel function includes determining respective attribute vectors for the respective jobs and computing a kernel of the respective attribute vectors;
    determining a schedule for the multiple jobs based on the priority values;
    outputting scheduling data representing the determined schedule to enable the multiple jobs to be carried out according to the schedule.

2. The method of claim 1, wherein the representation of the selected job includes one or more of: a release date of the selected job, a logarithm of the release date, a weight of the selected job, a logarithm of the weight, a processing time of the selected job, a logarithm of the processing time.

3. The method of claim 2, further comprising computing an aggregate of a job attribute over the multiple jobs to be scheduled, and including the aggregate in representation of the selected job.

4. The method of claim 3, wherein evaluating the kernel function comprises computing a degree of similarity between the multiple jobs to be scheduled and a set of jobs corresponding to the reference job.

5. The method of claim 1, further comprising:
    obtaining data representing multiple respective priority functions;
    determining respective schedules according to the respective priority functions; and
    selecting a schedule among the respective schedules.

6. The method of claim 1, wherein at least one of the attribute vectors includes an attribute corresponding to a sum or average of an attribute corresponding to a weight, a processing time, or a release date over all jobs to be scheduled.

7. A computer-implemented method of determining a priority function for scheduling jobs of a manufacturing or logistics process or for data package transmission in telecommunications, wherein the priority function is defined to determine a priority value indicating a priority for a job of the manufacturing or logistics process, and wherein the method comprises the following steps:
    accessing training data including a set of multiple training jobs, and obtaining from the training data one or more training instances, wherein each training instance includes multiple jobs of the set of the training jobs ordered according to a target schedule, wherein the multiple jobs include an earlier job ordered before a later job;
    obtaining a kernel function, wherein the kernel function is defined to compare representations of two respective jobs, wherein a class of priority functions is defined in terms of the kernel function, wherein a priority function of the class of priority functions includes comparisons according to the kernel function with one or more reference jobs, wherein the kernel function is configured to be evaluated by determining respective attribute vectors for the two respective jobs and computing a kernel of the respective attribute vectors;
    determining the priority function by performing an optimization, wherein the optimization is configured to select the priority function from the class of priority functions, and wherein the optimization is configured to penalize the priority function for assigning a higher priority to the later job than to the earlier job; and
    outputting the determined priority function from the class of priority functions for use in the manufacturing or logistics process.

8. The method of claim 7, further comprising:
    obtaining the training instance by selecting the multiple jobs from the set of training jobs, and
    determining the target schedule for the selected multiple jobs.

9. The method of claim 8, wherein the determining of the target schedule includes determining an optimal or near-optimal target schedule.

10. The method of claim 7, wherein the class of priority functions is a class of linear combinations of comparisons with reference jobs, and wherein the optimization penalizes the priority function by optimizing a loss function defined over respective pairs of consecutive earlier and later jobs of the training set.

11. The method of claim 10, wherein the optimizing includes iteratively: selecting the earlier job and the later job from the respective pairs such that the earlier and later job provide a contribution to the loss function; and adapting the current priority function to reduce the contribution to the loss function.

12. The method of claim 7, wherein the method further comprises:
determining a position priority function for each given position, wherein the position priority function is configured to separate jobs occurring at the given position in respective training instances at least from jobs occurring after the given position in the respective training instances; and
combining respective position priority functions for respective positions into an overall priority function.

13. The method of claim 12, further comprising:
determining the position priority function as a classifier defined by a system of respective inequalities, wherein the position priority function is computed based on differences to decision boundaries of the respective inequalities.

14. The method of claim 7, wherein at least one of the attribute vectors includes an attribute corresponding to a sum or average of an attribute corresponding to a weight, a processing time, or a release date over the respective two jobs.

15. A scheduling system for scheduling jobs of a manufacturing or logistics process or for data package transmission in telecommunications, the system comprising:
a data interface configured to access data representing a priority function, wherein the priority function is defined to determine a priority value indicating a priority for a job of the manufacturing or logistics process, wherein the priority function is defined to invoke a kernel function, wherein the kernel function is defined to compare representations of two respective jobs, and wherein the priority function includes comparisons by the kernel function of the job with one or more reference jobs;
an input interface configured to obtain job status data including representations of multiple jobs to be scheduled;
an output interface configured to output scheduling data representing a schedule to enable the multiple jobs to be carried out according to the schedule; and
a processor subsystem configured to:
obtain, via the input interface, the job status data including the representations of the multiple jobs to be scheduled;
evaluate the priority function on the multiple respective jobs to obtain multiple respective priority values, wherein the evaluating of the priority function on a selected job of the multiple respective jobs includes evaluating the kernel function on representations of the selected job and the reference job, wherein the evaluating of the kernel function includes determining respective attribute vectors for the respective jobs and computing a kernel of the respective attribute vectors;
determine a schedule for the multiple jobs based on the priority values;
output, via the output interface, the determined schedule to enable the multiple jobs to be carried out according to the schedule.

16. The scheduling system of claim 15, wherein at least one of the attribute vectors includes an attribute corresponding to a sum or average of an attribute corresponding to a weight, a processing time, or a release date over all jobs to be scheduled.

17. A training system for determining a priority function for scheduling jobs of a manufacturing or logistics process or for data package transmission in telecommunications, wherein the priority function is defined to determine a priority value indicating a priority for a job of the manufacturing or logistics process, the system comprising:
a data interface configured to access training data including a set of multiple training jobs;
a processor subsystem configured to:
obtain from the training data one or more training instances, wherein each training instance comprises multiple jobs of set of the training jobs ordered according to a target schedule, wherein the multiple jobs include an earlier job ordered before a later job;
obtain a kernel function, wherein the kernel function is defined to compare representations of two respective jobs, wherein a class of priority functions is defined in terms of the kernel function, wherein a priority function of the class of priority functions includes comparisons according to the kernel function with one or more reference jobs, wherein the kernel function is configured to be evaluated by determining respective attribute vectors for the two respective jobs and computing a kernel of the respective attribute vectors;
determine the priority function by performing an optimization, wherein the optimization is configured to select the priority function from the class of priority functions, and wherein the optimization is configured to penalize the priority function for assigning a higher priority to the later job than to the earlier job; and
output the determined priority function from the class of priority functions for use in the manufacturing or logistics process.

18. The training system of claim 17, wherein at least one of the attribute vectors includes an attribute corresponding to a sum or average of an attribute corresponding to a weight, a processing time, or a release date over the respective two jobs.

19. A non-transitory computer-readable medium on which are stored one or more of:
instructions for scheduling jobs of a manufacturing or logistics process or for data package transmission in telecommunications which, the instructions, when executed by a processor system, cause the processor system to perform:
obtaining data representing a priority function, wherein the priority function is defined to determine a priority value indicating a priority for a job of the manufacturing or logistics process, wherein the priority function is defined to invoke a kernel function, wherein the kernel function is defined to compare representations of two respective jobs, and wherein the priority function includes comparisons by the kernel function of the job with one or more reference jobs,
obtaining job status data including representations of multiple jobs to be scheduled,
evaluating the priority function on the multiple respective jobs to obtain multiple respective priority values, wherein the evaluating of the priority function on a selected job of the multiple respective jobs includes evaluating the kernel function to compare the selected job to the one or more reference jobs, wherein the evaluating of the kernel function includes determining respective attribute vectors for the respective jobs and computing a kernel of the respective attribute vectors, determining a schedule for the multiple jobs based on the priority values, outputting scheduling data representing the determined schedule to enable the multiple jobs to be carried out according to the schedule; and/or a priority function for use in scheduling jobs of a manufacturing or logistics process, wherein the priority function is defined to determine a priority value indicating a priority for a job of the manufacturing or logistics process, wherein the priority function is defined to invoke a kernel function, wherein the kernel function is defined to compare representations of two respective jobs, and wherein the priority function includes comparisons by the kernel function of the job with one or more reference jobs.

20. The non-transitory computer-readable medium of claim 19, wherein at least one of the attribute vectors includes an attribute corresponding to a sum or average of an attribute corresponding to a weight, a processing time, or a release date over all jobs to be scheduled.

* * * * *